United States Patent [19]
Suratt

[11] Patent Number: 6,071,355
[45] Date of Patent: Jun. 6, 2000

[54] METHOD FOR CLEANING A TRANSMISSION

[76] Inventor: Ted L. Suratt, 2333 Feathersound Dr., #C307, Clearwater, Fla. 33762

[21] Appl. No.: 08/990,667

[22] Filed: Dec. 15, 1997

[51] Int. Cl.$^7$ .................. B08B 3/04; B08B 5/04
[52] U.S. Cl. ............ 134/21; 134/22.1; 134/22.11; 134/22.12; 134/22.18; 134/22.19; 134/20; 134/26; 134/32; 134/39
[58] Field of Search .............. 134/21, 22.1, 22.11, 134/22.12, 22.18, 22.19, 20, 32, 26, 39

[56] References Cited

U.S. PATENT DOCUMENTS

| | | | |
|---|---|---|---|
| 4,197,140 | 4/1980 | Swan | 134/20 |
| 4,671,230 | 6/1987 | Turnipseed | 123/198 A |
| 5,232,513 | 8/1993 | Suratt et al. | 134/21 |
| 5,289,837 | 3/1994 | Betancourt | 134/57 R |
| 5,401,324 | 3/1995 | Huddas | 134/21 |

*Primary Examiner*—Zeinab El-Arini
*Attorney, Agent, or Firm*—Ronald E. Smith

[57] ABSTRACT

A method of cleaning the transmission system of a vehicle includes the steps of starting an engine of the vehicle and bringing it to normal operating temperature. A predetermined amount of a transmission cleaner is charged into the transmission and the vehicle is driven for a predetermined distance. The gears are changed at preselected times while driving so that all gears of the transmission are used equally. The engine is then shut down and transmission fluid is purged from the transmission fluid pan by submerging a trailing end of a first hose into the transmission fluid. A leading end of the first hose is connected into fluid communication with an inlet of a remote charging tank and an outlet of the remote charging tank is connected through a switch to a source of negative pressure. The switch is set to cause the transmission fluid to flow into a transmission fluid waste tank disposed between the outlet and the source of negative pressure. The trailing end of the first hose is then removed from the transmission fluid pan and a transmission cooling line is disconnected from a preselected port of the radiator. The trailing end of the first hose is placed into fluid communication with the transmission cooling line at the preselected port while maintaining the leading end of the first hose in fluid communication with the inlet of the remote charging tank. Transmission fluid is vacuumed from the transmission cooling line and the transmission cooling line is reattached so that all transmission fluid is removed from the transmission cooling lines and most of the transmission fluid is removed from the torque converter.

3 Claims, 24 Drawing Sheets

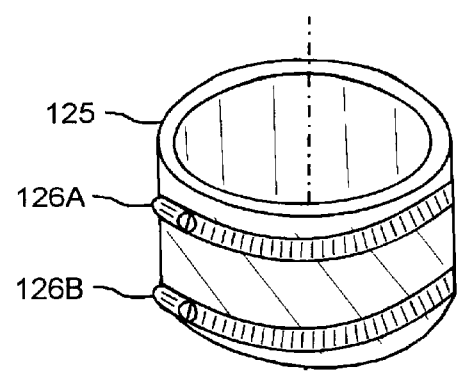
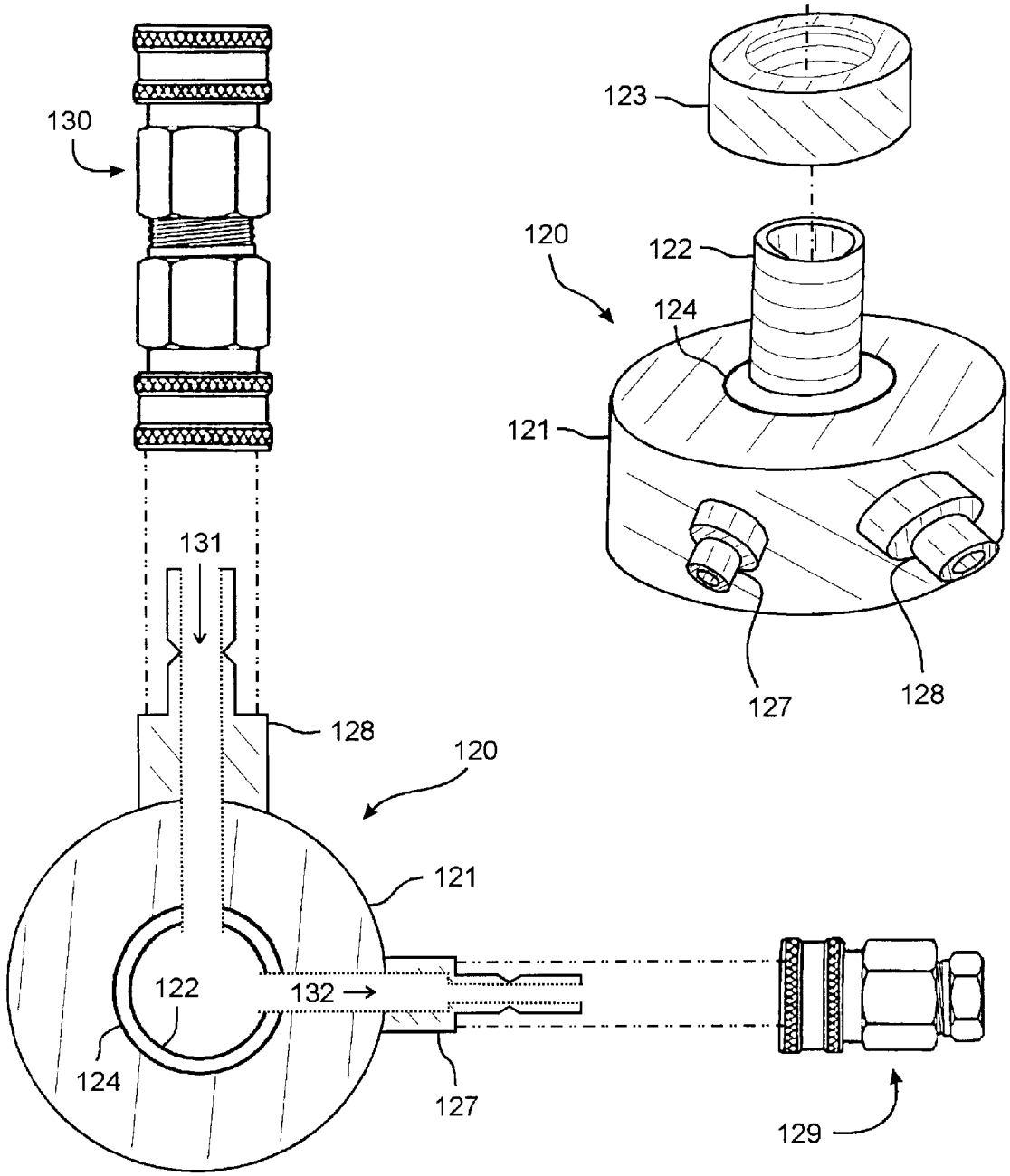

3/8" Flexible Hose

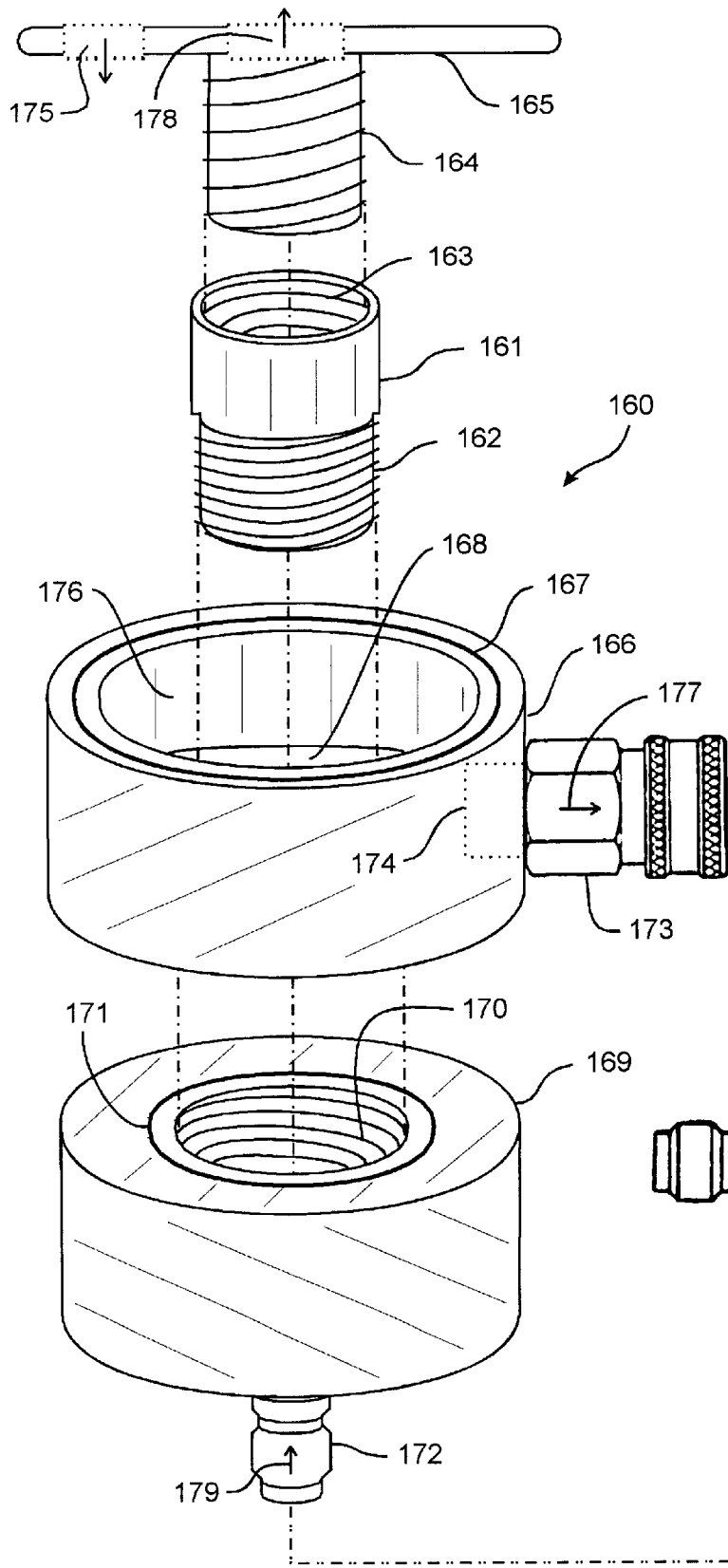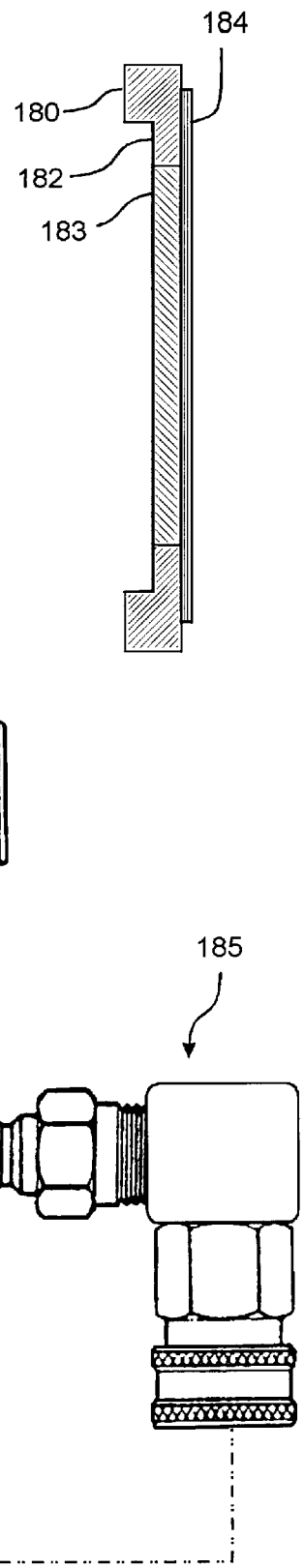

METHOD FOR CLEANING A TRANSMISSION

BACKGROUND OF THE INVENTION

1. Field of the Invention

This invention relates, generally, to the removal of internal contamination from internal combustion engines and automatic transmissions. More particularly, it relates to the removal of contamination that forms within the internal surfaces of an engine's lubrication, cooling, fuel induction, and exhaust systems, and within the internal components of an automatic transmission.

2. Description of the Prior Art

Governmental regulations and world-wide competition have brought about many changes in the automotive industry during the past decade. To eliminate waste, comply with new regulations, and become more competitive worldwide, automobiles have become smaller, lighter in weight and more efficient in operation. With the addition of computerized ignition systems, stainless exhaust systems, and longer lasting brakes and tires, today's vehicles, when new, are more efficient, more trouble-free, and less polluting than ever before. However, modern vehicles, although more trouble-free when new as compared to earlier models, have engines and transmissions that are less durable than older models and which are essentially non-adjustable and non-rebuildable. Thus there is a need to make modern engines last longer and perform properly longer.

It is well-known that virtually every problem that occurs in an automobile drive train is caused by contamination. Varnish, carbon, sludge, unburned hydrocarbons, and polymerized glycols are the main culprits. The benefits of removing contamination have been known for years, but the technology for doing so, without taking apart the engine or transmission, has been non-existent.

For the past one hundred years, the automotive industry, due to the lack of suitable technology, has been forced to deal with the effects of contamination by adjusting, repairing or replacing parts, and the only method for delaying these repairs were regular fluid and filter changes. The benefits associated with regular fluid and filter changes are well established, but better ways for dealing with contamination are needed.

With today's higher revving, hotter running engines and transmissions, simple fluid changes do not remove enough contamination to dramatically affect the useful life of the vehicle. Moreover, today's cars are electronically controlled, and contamination affects the conductivity of the sensors; as a result, onboard computers do a poor job of providing engines with the ideal fuel-air ratio because they are getting inacuurate input information.

The need to remove contamination is clear.

The problems created by contamination were addressed in the past. There are patents on machines and chemicals to remove contamination dating back to the early 1920s. The teachings of the prior art are that an engine will operate more efficiently and last longer when contamination is removed, but the art does not explain how and why this occurs. Moreover, the art teaches that contamination must be removed when an engine is not running. It can be surmised from the art that there is a problem relating to the operation of an engine and transmission as contamination builds up, but the art does not provide a complete working solution to the problem of contamination. Nor does the art explain what the contamination is composed of, how it got there, and how engine and transmission performance is affected; all of this must be determined by research and the solution to the problems must be derived from that research. Each different form of contamination in each support system affects the overall performance and operation of the unit as a whole.

Non-rebuildable components, non-adjustable fuel systems, and electronic sensors and controls, which are all affected by contamination, are relatively new in the automotive industry. In addition, many of the problems with contamination today were non-existent just a few years ago.

From the beginning of the automobile age until the oil filter became widely used in the 1940s, the biggest problem associated with contamination was the dirt and grit which enters into an engine's crankcase and wears out the bearings. The oil filter helped reduce this problem considerably by filtering out a majority of the foreign particles. However, bearings were still subjected to excessive wear during start-up of the engine because oil filters were not required to have an anti-drain back valve until the early 1960s.

There is a progression of technology that leads from simply flushing the oil reservoir out with flushing oil, to methods that actually pressurize the internal oil passageways with a flushing fluid to remove the loose contamination that resides within. Although loose contamination, such as sludge, needs to be removed, it is absolutely necessary to remove all of the forms of contamination completely, with a procedure that ensures no damage occurs during the removal, to properly maintain the treated engine.

Maintenance of an engine's cooling system requires removing old coolant, adding fresh coolant, or filtering old coolant to remove the impurities and adding back to the coolant additives that have been used up over time. It is also beneficial to remove any blockages created from loose pieces of contamination from within the cooling tubes of the radiator. Accomplishing these two items can be compared to the basic procedure of changing the oil and oil filter of an engine. To provide proper maintenance to an engine, one which will restore its operational characteristics to that of its original state, the heat transfer properties of the engine must also be restored by removing the build-up of polymerized coolant that forms an insulating layer within the cooling system. Without restoring its ideal heat transfer properties, the engine will be unable to properly cool itself as originally intended and will transfer the excess heat to the oil and the transmission fluid, subjecting such fluids to undue temperatures. Another important consideration in the cooling system is that of the temperature sensor. This sensor sends readings to the computer for adjustment of the fuel-air ratio. If this sensor is coated with an insulating layer of contamination, the signals to the computer are not accurate and improper adjustments of the fuel-air ratio will occur.

An engine's fuel system is designed to provide the engine with air and fuel in prescribed amounts, and the ratio is continuously adjusted by a computer via measurements performed by various sensors. As carbon is deposited on the internal areas of the system, the flow of air and fuel is disrupted. Carbon build-up creates air turbulence, not allowing the proper amount of air to reach the combustion chamber. It also acts like a sponge, soaking up portions of fuel intended for combustion. Like a sponge, when carbon is saturated it releases its liquid. This release is unexpected by the engine, so the computer tries to make adjustments when the liquid is released. Since the release is very brief, and afterwards the carbon absorbs fuel again, the adjustment by the computer is not correct and another adjustment is made. This creates a surging in the idleing of the engine. This example describes just one of the effects of carbon build-up within an engine.

Nor can the problem be solved by injecting a cleaning solution into the engine at the fuel rail and through the fuel injector tips. Fuel injector tips are placed very close to the intake valve and are designed to vaporize the fuel going into the combustion chamber. The cleaning solution is also vaporized and does not reach any other point within the intake manifold except for the area directly in front of the intake valve. The cleaning solution loses any kinetic energy that would be formed when droplets hit the carbon and is turned into steam from the heat of the manifold. It is also limited to just this one small area. The carbon build-up, resulting from thousands of hours of engine operation, spreads throughout the interior of the intake manifold.

The automatic transmission relies on internal fluid pressures to accomplish its job of providing power to the wheels of the vehicle. The fluid in an automatic transmission is very sensitive to heat. As the fluid is heated, it deposits varnish on the internal parts of the transmission. This varnish coats the seals, causing them to dehydrate. Dehydrated seals lose their ability to properly seal, causing internal pressures to fluctuate and causing external fluid leaks. The varnish also traps bits of metal and clutch plate particles against the interior surfaces of the transmission as it forms. Moving parts, such as accumulator valves, are also affected by varnish. It causes them to stick periodically, subjecting the clutch plates to excessive mating forces, causing the shift points to be rough and tearing excessive particles from the plates.

Simply changing this fluid and replacing the filter does not qualify as a complete maintenance service for the transmission. The deposited varnish must also be removed, along with any other contaminate particles that have been trapped within the varnish build-up. The standard maintenance currently being performed is to remove the fluid pan from the transmission, change the filter and replace any fluid that was discarded while removing the fluid pan. This procedure generally changes half of the transmission fluid. There are several machines which attempt to change all of the transmission fluid. One machine provides air pressure to force the remaining fluid out while the fluid pan is removed, and another machine simply pumps fresh fluid into the transmission until all of the old fluid is forced out.

Again, the key to the proper maintenance of an automatic transmission is to remove all of the varnish and other contamination that have formed inside.

The art fails to recognize the importance of removing all of the contamination from all of the support systems of the vehicle. The art also fails to consider the support systems as an integral whole that must be dealt with holistically and not individually. With engines now being entirely controlled by a multitude of sensors and their respective inputs which continually feed information to an onboard computer, each support system is integrated with the other and no system may be treated without consideration of the effect of such treatment on the other support systems.

The fuel-air ratio is the most important quantity for the proper operation of an engine. All moving parts must function on a timely basis and each sensor must send proper readings to the computer for it to properly adjust the fuel-air ratio.

Most prior art engine-cleaning processes are static processes, i.e., the engine does not run while such processes are performed. However, static processes do not remove the majority of the contamination from within the engine, especially contamination on top of the heads, within the lifter areas, and on the inside walls of the block. The few prior art processes that do operate with the engine running do not provide a complete back-up system to provide the engine with uninterrupted oil flow, should the oil pump screen or oil filter become clogged; such an interruption results in immediate engine damage.

Most prior art processes for cleaning fuel injection systems just address the problem of contamination build-up on the intake valve and the injectors. Rarely do the injectors build up any contamination within them. If they do, it is not a carbon residue; it is rust or similar contamination from the fuel rail itself, as the fuel filter is designed to trap contamination from the fuel tank. Any carbon build-up on the injector tip itself is formed around the outside of the tip, as the inside will stay clean from the pressure and cleaning ability of ordinary gasoline passing through it. Simply injecting a cleaning fluid through the injector will not remove contamination from the outside of the injector tip, as its spray pattern is directed at the intake valve. The vaporization of the cleaning fluid also reduces its cleaning effectiveness. The largest problem within the fuel system is the carbon contamination that forms upon the inside walls of the intake manifold, creating a sponge for excess fuel.

Prior art machines and processes for cleaning cooling systems are designed to remove and replace anti-freeze, thereby taking out impurities and adding back rust inhibitors. None of the earlier processes restore the heat transfer properties of the engine itself, even though such restoration is the most important aspect of restoring a cooling system. Simply changing anti-freeze can be done easily, without a machine.

Simply pressurizing a new transmission fluid into a transmission to displace the old transmission fluid is ineffective and wasteful. A substantial amount of fluid dilution takes place, and at least three times the original volume of fluid must be pumped into the transmission to remove a portion of the old fluid, i.e., that fluid which lies in the fluid lines and oil cooler. The fluid within the transmission pan would also be changed to some degree, but would require a much higher amount of fluid to completely replenish it. Pressurizing air into a transmission to push out fluid creates large volumes of vapors and mist, which make their way into the shop environment, creating a very unpleasant and possibly dangerous condition. Even with a combination of the above methods, the contamination must also be removed, or the new fluid will partially dissolve some of the lighter contamination within the transmission and eventually clog up the fluid filter. For this reason, some oil change facilities refuse to perform a standard transmission fluid and filter change on vehicles having over 70,000 miles if the owner cannot produce maintenance records indicating regular fluid changes; the shops have experienced too many "comebacks" of vehicles having clogged filters.

Prior art transmission system cleaners are simply mild solvents, with varying surfactants to reduce surface tension, and with anti-friction agents to provide added lubrication properties. Such solvents will not remove the contamination present in today's engines.

Known chemical solutions for cleaning fuel injectors consist primarily of aromatic solvents, such as toluene, and other solvents of such nature; they all have relatively high evaporation rates. These cleaners prematurely vaporize within the intake manifold, i.e., before they have the opportunity to complete the cleaning job. Thus there is a need for a cleaner of low volatility, having an ability to release excess amount of nascent oxygen to further clean the combustion chamber and the catalytic converter.

The radiator cleaners heretofore known typically consist of a caustic solution to clean the radiator and its related parts of calcium and lime deposits. This is accomplished either by removing the radiator or flushing the system in place. Components are then rinsed and the system is refilled with anti-freeze. Other cleaning systems merely power flush the system or filter the anti-freeze and add back inhibitors. All of these systems address restoring the anti-freeze condition and flow through the cooling system.

SUMMARY OF THE INVENTION

The primary object of this invention is to provide a method for reducing contamination-based problems associated with internal combustion engines of the current decade. The problems include decreasing performance, decreasing fuel economy, increasing toxic exhaust emissions levels, and decreasing engine lifetimes. Although the teachings and suggestions of this invention can be used successfully on any type of internal combustion engine, this disclosure focuses on the gasoline-operated automobile in use today.

The present invention includes a housing that accommodates a remote source of negative air pressure, a remote auxiliary oil filter, a remote reservoir for coolant, a remote charging tank into which is introduced various contamination-defeating chemical compounds, and a plurality of hoses providing selective fluid communication between the various active elements within the housing and various parts of the engine such as the oil drain pan, the transmission cooling lines, the radiator, the fuel system, and the like. A three way valve in the housing facilitates making many of the fluid connections, and a plurality of gauges and regulators enable control and condition-monitoring capabilities.

It is a primary object of this invention to provide an apparatus that will, when used with proper chemical cleaning compounds, safely remove damaging contamination that normally builds up within the internal areas of an engine's internal oil lubrication system, cooling system, gasoline fuel induction system, diesel fuel injection system, catalytic converter, and automatic transmission.

Another important object is to provide an improved apparatus that determines the cause of insufficient oil flow by analyzing the condition of the main and rod bearings, the oil pump, and the oil pump pick-up screen of an engine.

Still another object is to provide an improved process for an engine oil lubrication system that includes an apparatus that is easily connected to an engine, which is safe to operate, which is cost efficient, and which when used with proper chemical cleaning compounds, safely and completely removes damaging contamination to restore full volume oil flow and proper operation of the valve train components, and which enables analysis of the condition of the main and rod bearings, the oil pump, and the oil pump pick-up screen of an engine to determine the cause of insufficient oil flow.

Still another object is to provide a process for an engine cooling system that includes apparatus that is easy to connect, safe to operate, cost efficient and which, when used with proper chemical cleaning compounds, safely and completely removes damaging contamination, restores proper liquid flow and the heat transfer properties of the engine block, and which monitors the opening and closing temperatures of the thermostat, while not altering the properties of, or rendering useless, fresh anti-freeze that is introduced into the system.

Yet another object is to provide a process for a gasoline engine fuel induction system that is easily connected, safe to operate, cost efficient, and which will, when used with the proper chemical cleaning compounds, safely and completely remove the damaging contamination it contains, restoring proper air flow and fuel atomization, safely and completely removing the damaging contamination from the oxygen sensor located in the engine's exhaust system, allowing it to function properly, and which safely and completely removes damaging contamination from within the catalytic converter, located in the engine's exhaust system, thereby restoring its ability to reduce toxic emissions.

Another object is to provide an easily connected, safe to operate, cost efficient process for an engine's diesel fuel injection system that will, when used with the proper chemical cleaning compounds, safely and ccompletely remove the damaging contamination it contains, allowing the injectors to open promptly and close tightly.

Another object is to provide an easily connected, safe to operate, cost efficient process for an automatic transmission that will, when used with the proper chemical cleaning compounds, safely remove a high percentage of the old transmission fluid and the damaging contamination it contains, restoring full volume fluid flow, rstoring proper fluid pressure, restoring proper movement to accumulator valves and other moving parts, and rehydrating the seals and O-rings.

A still further object is to provide a method for reducing particulate emissions from motor vehicle exhaust. Particulate emissions are a primary concern of the U.S. Environmental Protection Agency. Automobile manufacturers are being compelled by regulations to continually improve the operation of emissions systems so that the emissions systems will function to keep unwanted emissions at prescribed levels. These manufacturers are being forced to spend millions of dollars in research and development to overcome the effects that occur inside the engine as contamination is formed. The manufacturers are protesting these new regulations because they believe there are no technologies available at present to combat this problem.

Particulate emissions are formed from the incomplete combustion of gasoline. Complete combustion emits carbon dioxide and water, both of which are very small molecules. Incomplete combustion emits large molecules of unburned hydrocarbons. Particulate emissions are not a major problem with new engines, but as contamination builds up over time within an engine, such contamination causes the fuel and air to be blended together in a less than an optimal manner. Thus, removing contamination from all engine areas that affect the combustion mixture, such as the oiling system, the fuel/air intake system, and the cooling system, restores proper fuel and air mixture and thus improves combustion.

Further objects and advantages of this invention are to provide a comprehensive preventative maintenance program that removes damaging contamination from within an internal combustion engine and an automatic transmission, to restore lost performance and fuel economy, reduce toxic and particulate emissions, reduce mechanical failure, and generally prolong the useful life of an engine and transmission, simply and cost effectively. For a complete preventative maintenance procedure for today's new vehicles, the steps of the novel complete contamination removal system disclosed herein should be accomplished on a regular basis, approximately every 25,000 miles, to maintain proper performance and operation, and to extend the life cycle of such vehicles.

The invention accordingly comprises the features of construction, combination of elements and arrangement of parts that will be exemplified in the disclosure hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 7A is an exploded view of the novel radiator adapter assembly;

FIG. 7B is an exploded, top plan view of the novel radiator adapter assembly and alternate connectors;

FIG. 10A is an exploded view of the novel oil filter adapter and alternate connector;

FIG. 10B is a cross-sectional view of the novel oil filter adapter plate;

DETAILED DESCRIPTION OF THE PREFERRED EMBODIMENT

Figure 1:
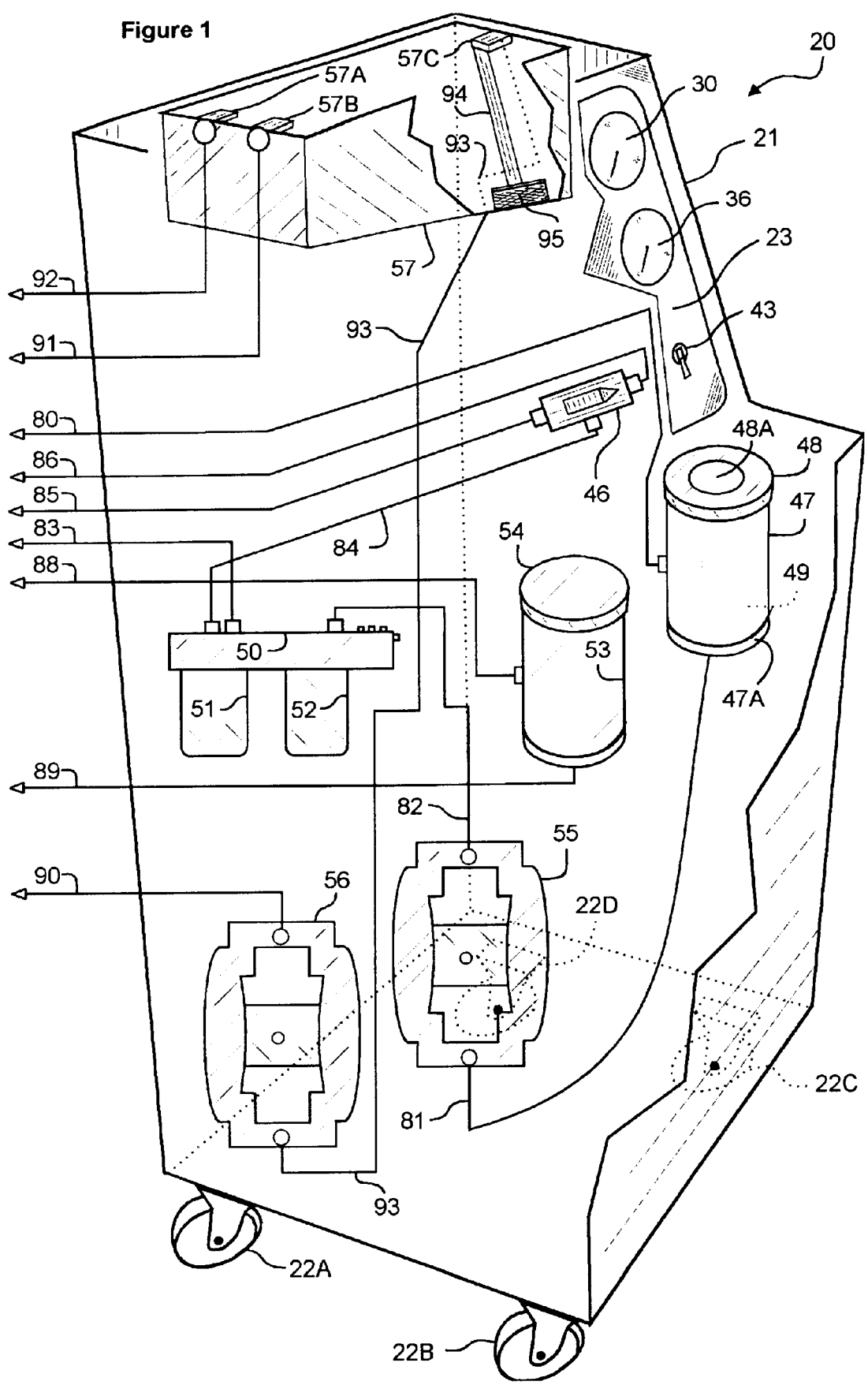
FIG. 1 is a partially cut-away isometric view of an illustrative embodiment of the novel apparatus.

An illustrative embodiment of the novel decontamination apparatus or machine is depicted in FIG. 1 and is denoted 20 as a whole. Housing 21 is movably supported at its corners by caster wheels, 22A–D.

Face panel decal 23 is secured to the upper front surface of housing 21.

Engine process fluid flow tank 47, referred to in the claims as a first remote charging tank, is mounted by suitable means within housing 21; the top of tank 47 is flush with a substantially horizontal wall of housing 21, said wall being suitably apertured to receive said top. Imperforate circular bottom wall 47A is attached by suitable means to the bottom of tank 47. Lid 48 is screw-threaded onto the uppermost rim of said tank. An O-ring seal, not shown, cooperates with lid 48 to provide an air-tight seal when said lid is securely fastened. Sight glass 48A enables an operator of machine 20 to view the processes taking place within tank 47. Tank 47, when sealed by lid 48, holds a vacuum of 29" Hg without leakage. Check screen 49 is removably mounted within tank 47; a one inch clearance is maintained between the bottom wall of said screen 49 and bottom wall 47A of tank 47. A C-clip or other suitable support means, not shown, may be positioned atop bottom wall 47 for this purpose, i.e., to support check screen 49 at said spacing. Screen 49 filters all fluid flowing through tank 47; it is made of a fine mesh, stainless wire screen and may have a handle to facilitate its removal and replacement.

Figure 5:
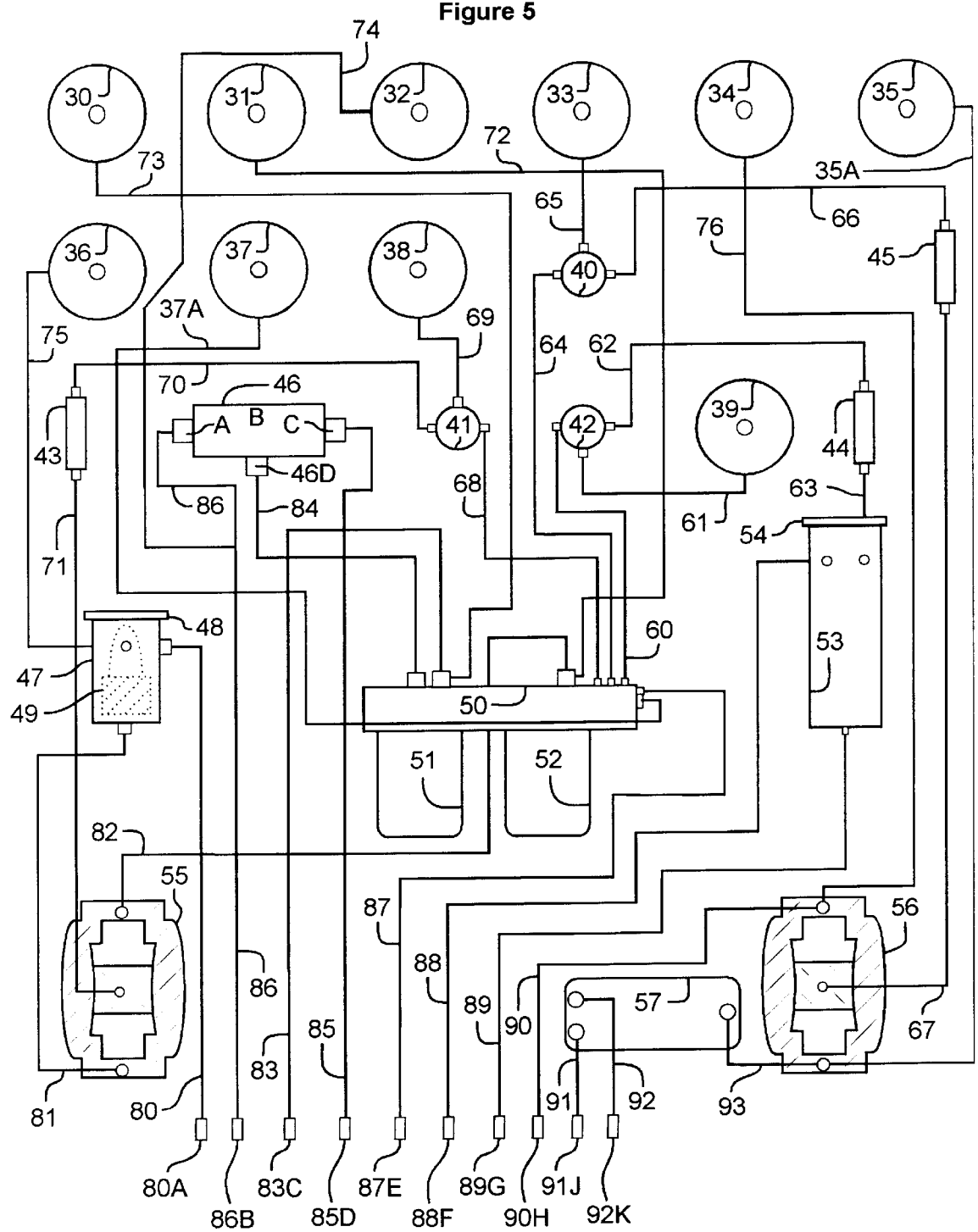
FIG. 5 is a schematic view of the novel apparatus.

Three apertures are formed in tank 47 for mounting fluid and air communicating means (see FIG. 5).

Fuel process tank 53, referred to in the claims as a second remote charging tank, is also mounted within housing 21 by suitable means. Tank 53 has a structure substantially the same as that of tank 47; it lacks a sight glass. Tank 53, when sealed with lid 54, withstands up to 100 psi air pressure without leakage. As depicted in FIG. 5, three apertures are formed in tank 53 for mounting fluid and air communicating means.

Figure 3:
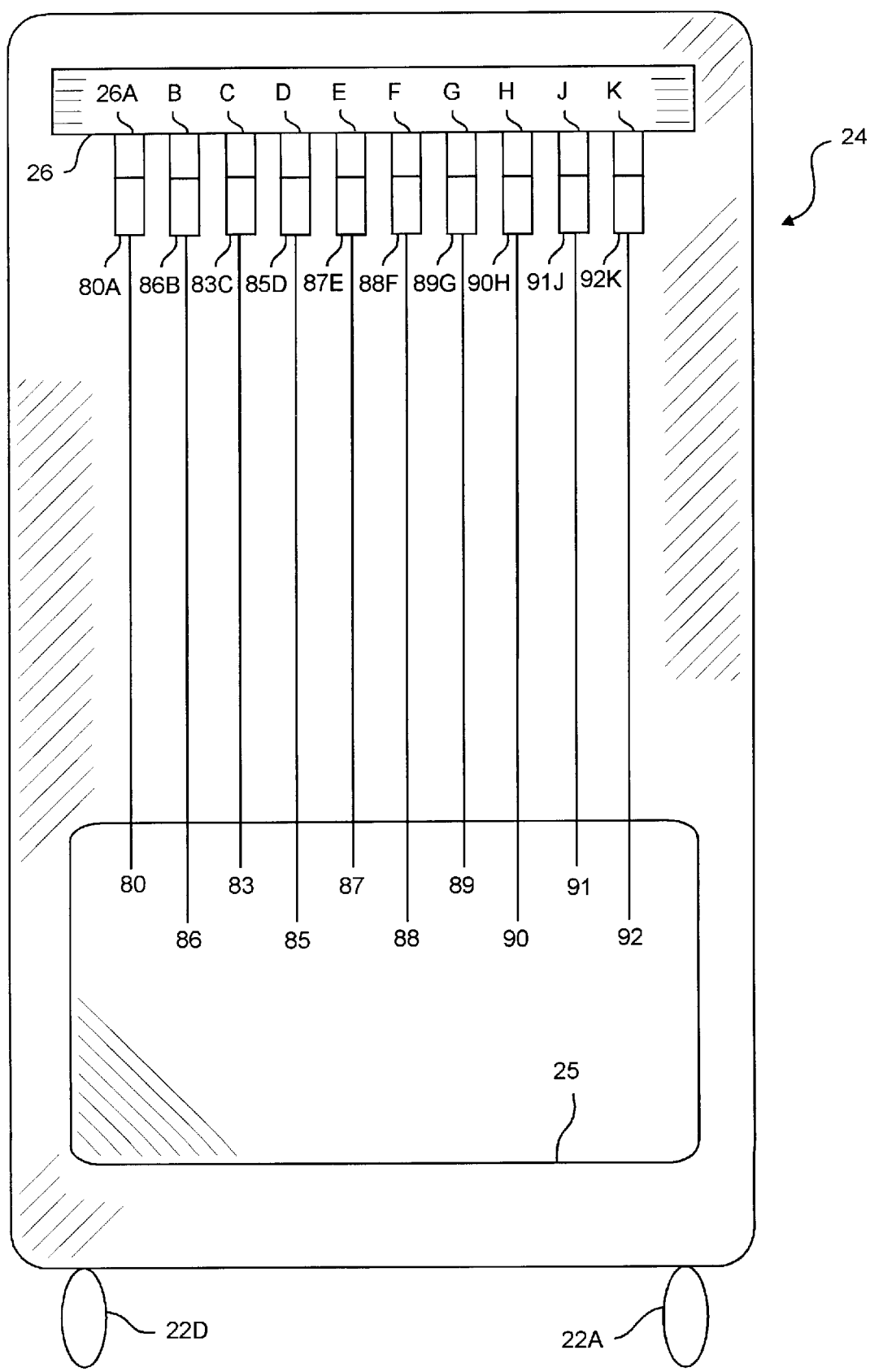
FIG. 3 is a rear elevational view of the novel machine.
Figure 4A:
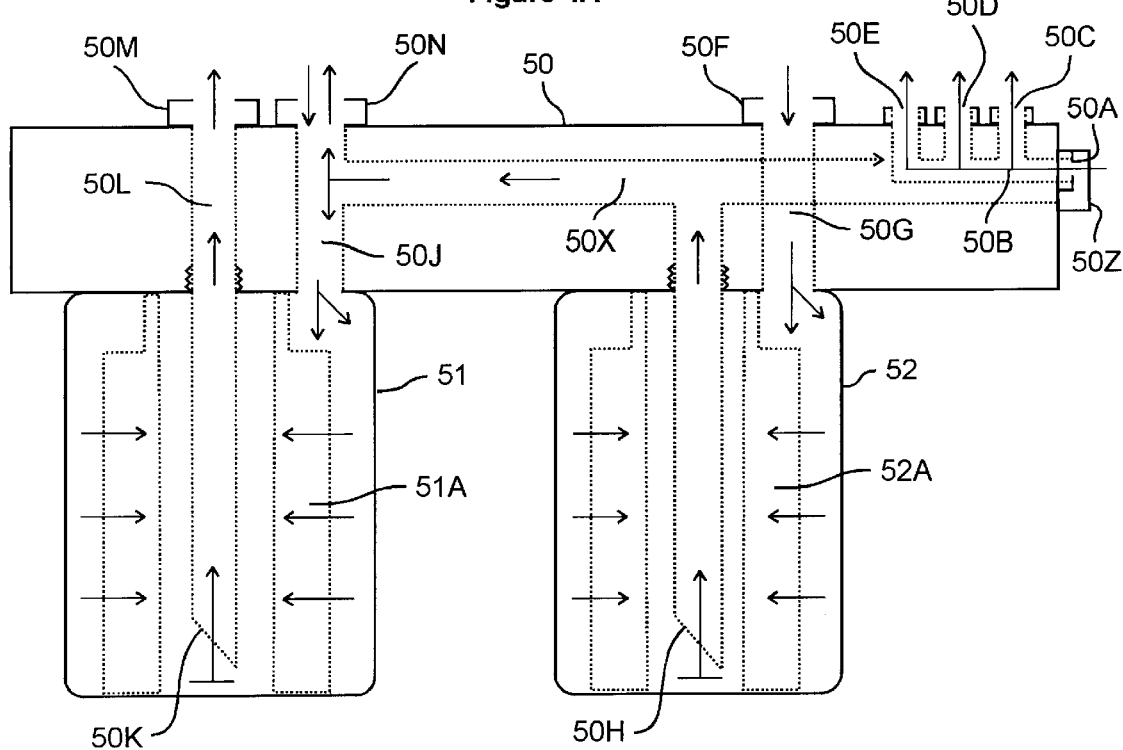
FIG. 4A is a side elevational view of the novel filter block assembly.
Figure 4B:
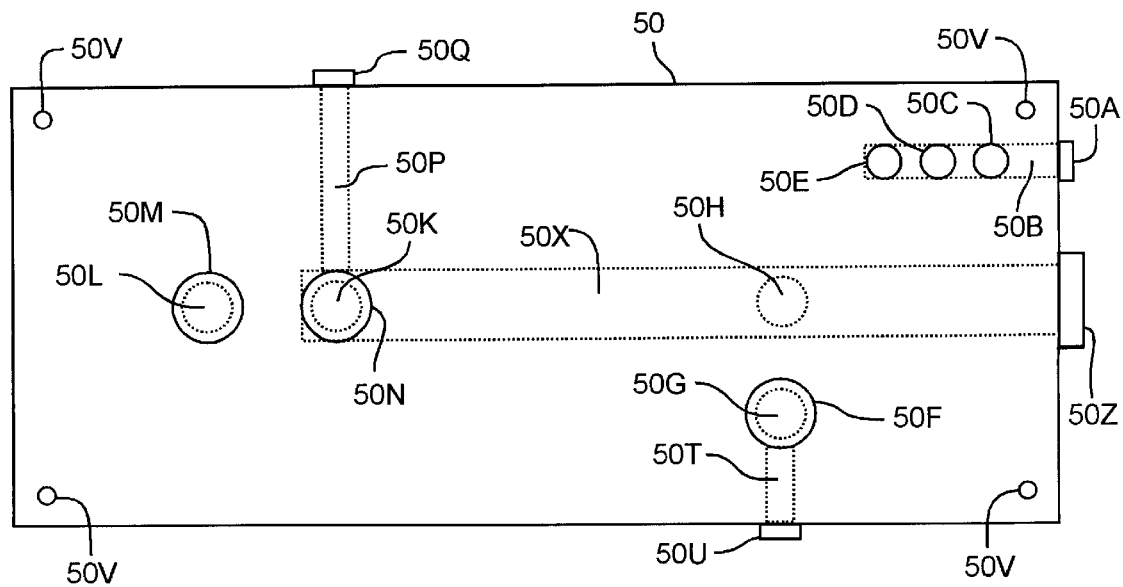
FIG. 4B is a top plan view of the novel filter block assembly.

Filter block 50 is attached to a mounting bracket (not shown), with suitable fastening hardware (not shown) through holes 50V (shown in FIG. 4B). The mounting bracket is permanently attached to the inside walls of housing 21 so that filter block 50 is positioned in vertically spaced relation to the bottom wall of housing 21 and in horizontally spaced relation to housing back door 24 (FIG. 3). Filter block 50 is positioned so that fluid filter 51 is readily accessible from the back of housing 21 and so that fluid filter 52 is directly behind filter 51, towards the front of housing 21. Filters 51 and 52 are conventional automobile oil filters; note that there is one input for said filters and two outputs which are referred to in the claims as the first and second outputs.

Engine process air pump 55 and cooling process air pump 56, each of which is referred to in the claims as a source of negative air pressure, are also mounted by suitable means within housing 21. Pumps 55, 56 are industry standard, 1:1 ratio, double-diaphragm, air operated pumps, having a flow capacity of about ten gallons per minute or so. The top port on each pump is the output port, the bottom port is the input, or suction port, and the middle port is the air supply port.

Engine process 3-way directional flow valve 46 is a conventional ball valve; it is panel mounted and its function is to facilitate the making of the numerous hose hook-up configurations of this invention.

Cooling process tank 57, referred to in the claims as a remote coolant reservoir, is mounted by suitable means, including a flange, for example, so that it depends from the top wall of housing 21. Tank 57 has three fittings which extend through its side walls; accordingly, the respective outboard parts of each fitting are connectable to hoses and the respective inboard parts thereof are connected to fittings, as follows.

The outboard part of cooling overflow fitting 57A is in fluid communication with cooling process overflow hose 92, and the inboard part thereof is threadably connected to a PVC elbow such that the end of said elbow faces down into tank 57. The outboard part of cooling input flow fitting 57B includes a brass elbow that is in fluid communication with cooling process input hose 91, and the inboard part thereof is connected to a PVC elbow having its opening facing down into tank 57. Similarly, elbows are secured to the opposite ends of cooling tank suction fitting 57C, the outboard elbow being brass and the inboard elbow being made of PVC. The outboard elbow is in fluid communication with internal pressure line 93 which is in turn in fluid communication with vaccum pump 56 and the inboard elbow threadably engages a quick coupling socket.

Cooling process tank suction hose 94 provides fluid communication between a quick coupling plug (not shown) at its upper end and cooling tank suction screen 95 at its lower end. The upper end of said hose is releasably attached to fitting 57C and the second end, with screen 95, extends to the bottom wall of tank 57.

Figure 2:
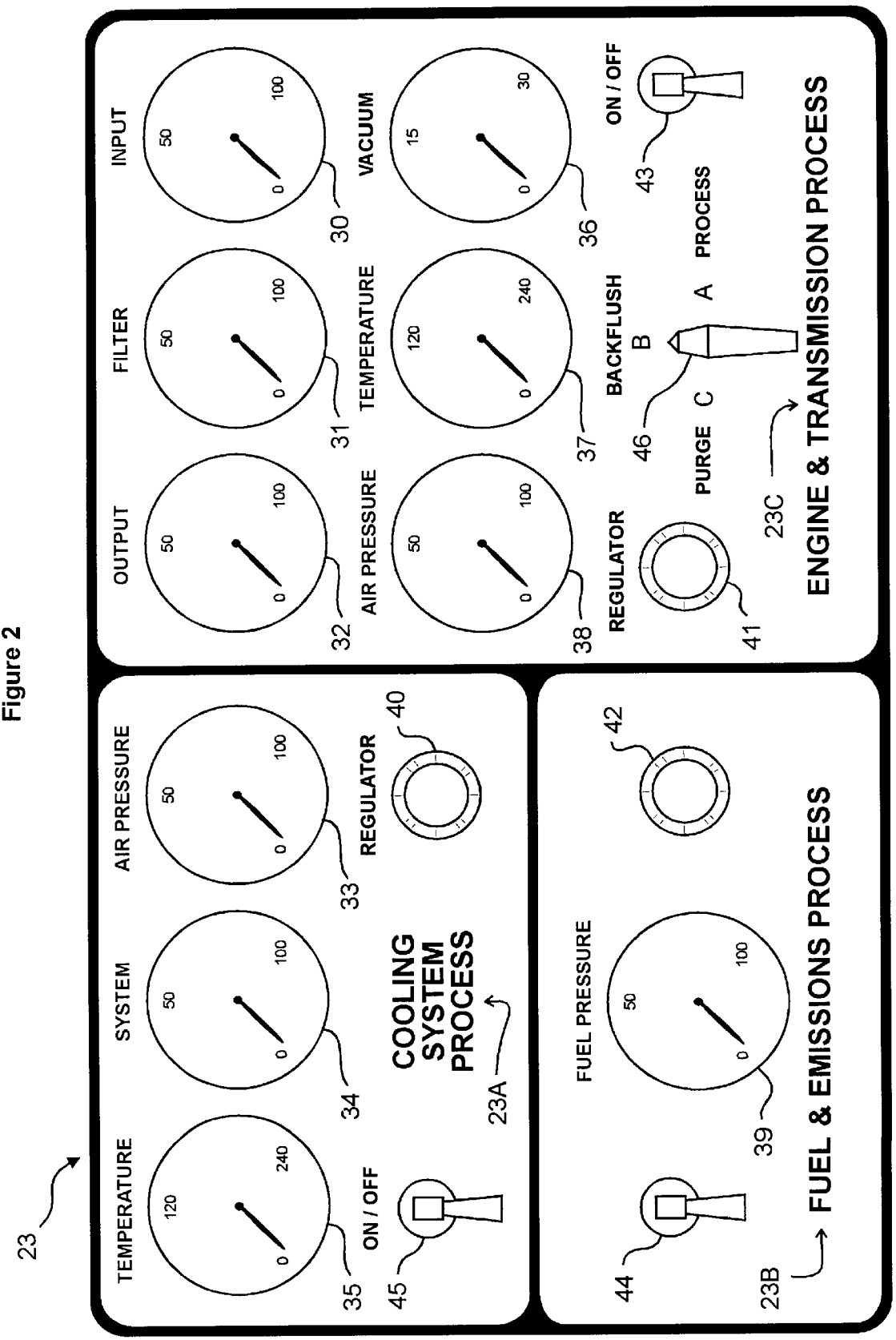
FIG. 2 is a frontal view of the novel operation panel.

Referring now to FIG. 2, it will there be seen that face panel decal 23 is divided into three sections: Cooling System Process section 23A, Fuel & Emissions Process section 23B, and Engine & Transmission Process section 23C.

Section 23A includes cooling process temperature gauge 35 which indicates the temperature of fluid passing through pump 56 via sending unit 35A (FIG. 5). Gauge 35, in a preferred embodiment, has a temperature range of 40–240 degrees Fahrenheit and monitors the temperature of the engine coolant.

Said section further includes a cooling process system pressure gauge 34 which indicates the pressure of fluid leaving pump 56. Gauge 34 preferably has a pressure range of 0–100 psi, and monitors the pressure of fluid flowing to the engine cooling system.

Cooling process air pump pressure gauge 33, also in section 23A, indicates the air pressure available to pump 56. Gauge 33 has a pressure range, preferably, of 0–100 psi, and monitors adjustments in available air supply to pump 56.

Cooling process on/off toggle switch 45 is thrown to activate vacuum pump 56.

Cooling process air pressure regulator 40 regulates the air supply to pump 56. Regulator 40 has a range of 2–100 psi, preferably, and is ported to allow attachment of gauge 33 to monitor the downstream air pressure leading to pump 56.

Section 23B includes fuel process tank air pressure gauge 39 which indicates the air pressure available to tank 53. Gauge 39 has a pressure range of 0–100 psi, in a preferred embodiment, and monitors adjustments in available air supply to tank 53.

Said section 23B further includes fuel process on/off toggle switch 44 which admits air into and presurizes tank 53 when said switch is in its "On" position. When in its "Off" position, it relieves downstream pressure.

Fuel process air pressure regulator 42, also included in Section 23B, is employed to regulate the air supply to tank 53. Regulator 42 preferably has a range of 2–100 psi, and is ported to allow attachment of gauge 39 to monitor the downstream air pressure leading to tank 53.

Section 23C includes engine process output pressure gauge 32 which indicates the pressure of fluid leaving filter block 50. Gauge 32 has a preferable, exemplary pressure range of 0–100 psi, and monitors the pressure of fluid flowing to the primary oil journal of the engine.

Said section 23C further includes engine process filter pressure gauge 31 which indicates the pressure of fluid flowing into filter 52. Gauge 31 has a preferable pressure range of 0–100psi, and monitors the condition of filters 51 and 52. The condition of said filters is determined by comparing the respective readings of gauges 31 and 32. The condition of filter 52 only may be determined by comparing the respective readings of gauges of 30 and 31. Filter 51 can only be checked only while the engine is running and the pump is in the stall mode.

Engine process input pressure gauge 30, also a part of Section 23A, indicates the pressure of fluid inputted from engine process input hose 83. Gauge 30 has a pressure range, preferably, of 0–100 psi, and is employed to monitor the pressure of fluid flowing from the engine oil pump (not shown).

Engine process air pump pressure gauge 38 indicates the air pressure available to pump 55. Gauge 38 has a preferred pressure range of 0–100 psi, and monitors adjustments in available air supply to pump 55.

Engine process temperature gauge 37 indicates the temperature of fluid flowing through filter block 50 via sending unit 37A (FIG. 5). Gauge 37 has a preferred temperature range of 40–240 degrees Fahrenheit and monitors the temperature of engine oil during an engine contamination removal process.

Engine process vacuum gauge 36 measures the vacuum created in tank 47 by pump 55. Gauge 36 has a preferred range of 0–30" Hg and monitors fluid flow pressure between drain opening 193 (FIGS. 11 & 12) and tank 47 during an engine process.

Engine process on/off toggle switch 43 activates pump 55 when in its "On" position.

Engine process air pressure regulator 41 regulates the air supply to pump 55. Regulator 41 has a preferred range of 2–100 psi, and is ported to allow attachment of gauge 38 to monitor the downstream air pressure leading to pump 55.

Engine process 3-way directional flow valve 46 directs output flow of fluid from internal pressure line 84 (FIG. 1) when in position A or position C, and shuts off output flow when in position B.

FIG. 3 is a rear elevational view of rear door 24 of housing 21. Opening 25 in door 24 provides an opening for hoses and further provides access to filters 51 and 52.

Process hose mounting bracket 26 is molded into door 24 during manufacturing. Hose hangers 26A–K depend from bracket 26 in equidistantly spaced relation to one another. Hose hangers 26A–K are reciprocating quick coupling mates for quick coupling connections 80A, 86B, 83C, 85D, 87E, 88F, 89G, 90H, 91J, 92K on hoses 80, 86, 83, 85, 87, 88, 89, 90, 91, 92, respectively, which extend outward through opening 25 from the inside of machine 20. When a hose 80, 86, 83, 85, 87, 88, 89, 90, 91, 92 is not in use, its quick coupling end is attached to its associated hose hanger 26A–K to prevent leakage of fluids or pressure in the event an operator of machine 20 inadvertently throws a switch incorrectly. The quick coupling connectors have internal pipe threads on the non-quick coupling end, and vary in thread size. The internal pipe threads of hose hangers 26A–K are threadably adapted with pipe thread reducing bushings where necessary, and they threadably receive a set screw (not shown) that is coated with a thread sealing compound to hermetically seal the quick coupling. The set screw also protrudes into the interior of bracket 26 and receives a locking nut (not shown) to secure said hose hangers.

Filter block 50 is depicted in FIG. 4A in detail in side elevation. Air supply input port fitting 50A is in fluid communication with air supply input passageway 50B. Passageway 50B is in fluid communication with air supply distribution fittings 50C, 50D, and 50E. Input port fitting 50F is in fluid communication with input passageway 50G which allows liquid flow to enter filter 52. Liquid inside filter 52 flows through internal fluid filter element 52A to tube 50H. Tubes 50H and 50K are draw tubes that ensure complete fluid flow from filters 52 and 51, respectively, even when air is present within said filters. As fluid flows through tube 50H, it intersects with horizontal passageway 50X which is in longitudinal alignment with passageway 50B. Sending unit 37A is threadably sealed into threaded port 50Z, and extends into passageway 50X from port 50Z to the point where passageway 50X joins tube 50H. Sending unit 37A records the temperature of the fluid as it flows through filter 52 and enters passageway 50X. Measuring the fluid temperature at that location ensures monitoring of the fluid temperature at its coolest location, i.e., as it exits the oil pan (not shown) of an engine.

Fluid flows through passageway 50X to vertical passageway 50J in filter block 50 and thus enters filter 51. Fluid flow from passageway 50X, entering passageway 50J, combines with an additional fluid flow entering passageway 50J from hose 83 which is threadably connected to a port fitting 50N, and the resulting fluid flows through passageway 50J into filter 51. During certain operations of machine 20, fluid flow from passageway 50X is forced to exit passageway 50J through port fitting 50N, instead of entering into filter 51. Fluid from passageway 50J flows into filter 51 and flows through internal fluid filter element 51A, to tube 50K, through passageway 50L and exits block 50 via a port fitting 50M.

A top plan view of block 50, depicted in FIG. 4B, indicates, in dotted lines, internal passageways not visible in FIG. 4A. Passageway 50G joins horizontal passageway 50T which extends horizontally to the front side of block 50 and has a threadably attached port fitting 50U which connects to internal pressure line 72 to measure the fluid pressure at the input of filter 52. Passageway 50X joins horizontal passageway 50P which extends to the rear of block 50 and has a threadably attached port fitting 50Q which connects to internal pressure line 73 to measure the pressure of fluid entering filter 51. Corner holes, collectively denoted 50V, are drilled into block 50 to facilitate the mounting of block 50 within machine 20, as mentioned earlier.

FIG. 5 is a schematic view of internal components 30–57 and their respective connections and pressure lines 60–93. Internal components 30–46, 51–52, 55, and 56 are industry standard components, employ npt pipe threads (tapered threads for air tight seals) for mounting brass connectors, and are commercially available. The fittings (not shown) used to connect components are industry standard brass type fittings. Internal pressure lines 60–76 are made of Teflon® tubing, and the fittings used to connect lines 60–76 are npt threaded at the first end, and are the "push-on/snap-tight" type at the second end for inserting and securing the Teflon tubing without special tools. Hoses and pressure lines 80–94 are flexible chemical or air hoses with "push-on/stay-put" barbs on a first end and npt thread on the second end.

The routing of the hoses and lines will now be described. The routing described is the normal flow route, but during certain phases of the engine and cooling process operation of the equipment, flow direction through specific hoses is reversed, as set forth hereinafter.

Air pressure is the only source of power for machine 20. A quick coupling plug 87E (depicted at the bottom center of FIG. 5) is connected to a compressed and filtered shop air supply (not shown) of at least 100 psi and no more than 150 psi. Air supply input hose 87 provides fluid communication from said unillustrated air supply to block 50; it is split into three directions (passageways 50C–E) in said block 50 at passageway 50B (FIG. 4A).

First passageway 50C is in fluid communication with internal pressure line 60 which communicates with the input port for regulator 42. Internal pressure line 61 extends from the output of regulator 42 to air pressure gauge 39. Air from regulator 42 flows through internal pressure line 62 and communicates with switch 44. When switch 44 is activated, regulated air flows through internal pressure line 63 into tank 53, via a fitting, not shown. This air pressure is used to pressurize fluid from tank 53, through fuel process output hose 89 which extends from the bottom wall of tank 53 to fuel process output connector 89G. When switch 44 is deactivated, air supply to tank 53 is terminated and any pressure within line 63, tank 53, or hose 89 is relieved by a vent, not shown, on the downstream side of switch 44. This safety factor ensures that pressure does not remain in tank 53 after switch 44 is turned off, so that tank 53 is not opened while pressurized. Gauge 39 displays the amount of air pressure to which regulator 42 is adjusted; it does not reflect the actual pressure in tank 53.

During a diesel fuel system cleaning process, a return line for the flow of cleaning solution back to tank 53 is required. This return flow is accommodated by a fuel process return hose 88 and a fuel process return hose connector 88F, connected to tank 53 with a fitting, not shown, near the point where hose 63 connects to tank 53. Tank 53 then has utility as a small auxiliary fuel tank for the diesel engine during a fuel system cleaning, as described in more detail below.

Second passageway 50D admits air into internal pressure line 64 which communicates with the input port of regulator 40. Air then flows through internal pressure line 65 and communicates with air pressure gauge 33. Air from regulator 40 flows through internal pressure line 66 and communicates with switch 45. When switch 45 is activated, regulated air flows through internal pressure line 67 to pump 56. This air pressure is used to operate the internal moving parts of pump 56. When switch 45 is deactivated, air supply to pump 56 is terminated and air pressure within line 67 is relieved by a vent, not shown, contained in the air motor section of pump 56.

Third passageway 50E admits air into internal pressure line 68 which communicates with the input port of regulator 41. Air then travels through internal pressure line 69 and communicates with air presure gauge 38. Air from regulator 41 flows through internal pressure line 70 and communicates with switch 43. When switch 43 is activated, regulated air flows through internal pressure line 71 to pump 55. This air pressure is used to operate the internal moving parts of pump 55. When switch 43 is deactivated, air supply to pump 55 is terminated and air pressure within line 71 is relieved by a vent, not shown, contained in the air motor section of pump 55.

When pump 55 is switched on, a vacuum is created in internal pressure line 81, which is connected to bottom 47A of tank 47, creating a vacuum in tank 47 when lid 48 is sealingly attached thereto. This vacuum is measured by gauge 36, which is connected to tank 47 via internal pressure line 75. When vacuum is created in tank 47, engine process vacuum hose 80, which is connected to tank 47 at its first end, transmits the vacuum to specific adapters described below. This vacuum is harnessed by a technician to remove oil and transmission fluid from their respective reservoirs. When fluid is vacuumed through connector 80A and enters pump 55, the fluid is pressurized. Said pressurized fluid exits pump 55 at its top port and travels through internal pressure line 82 to block 50 at port 50F (FIG. 4A). As the fluid enters port 50F and passageway 50G, passageway 50T is pressurized and sends a pressurized flow of fluid through internal pressure line 72 which is connected to pressure gauge 31. The fluid is then filtered by filter 52, flows into filter 51, is filtered again, then exits block 50 via port 50M and enters internal pressure line 84, which communicates with input port 46D of valve 46; see FIG. 5.

When valve 46 is switched to position A, the fluid in line 84 is routed to engine process output hose 86 and engine process output hose connector 86B. Connector 86B attaches to oil filter adapter 160 (see FIG. 10A). Hose 86 supplies oil to the engine during an engine process. It is this pressure that gauge 32 monitors via internal pressure line 74 connected to valve 46 at port 46A. When valve 46 is switched to position C, the fluid in line 84 is routed to engine process purge hose 85 and engine process purge hose connector 85D. Connector 85D is attached to a suitable waste oil tank, not shown, for disposal of fluids from the engine and transmission. When the engine and transmission processes are finished, fluids remaining in these reservoirs are evacuated with machine 20 by suction with hose 80 and then by pressuring the fluids through hose 85 into a suitable waste container.

When valve 46 is switched to position B, fluid flow within hose 84 is terminated. Switching to position B is appropriate only when the engine is not operating. As pump 55 is supplying fluid to block 50, with valve 46 in position B, the fluid is forced out of block 50, in a direction that is the reverse of its normal flow, through port 50N, flowing through engine process input hose 83 and engine process input hose connector 83C. When valve 46 is in position B, because of the isolation capabilities of adapter 160, machine 20 can back-flush the oil pump screen on an engine. During normal engine process operation, when valve 46 is in position A and the engine is operating, oil from the engine oil pump is routed into hose 83 via adapter 160 (see FIG. 10A). Oil then flows into block 50 at port 50N, pressurizing passageway 50P, which sends a pressurized flow through internal pressure line 73 which is connected to pressure gauge 30, heats the sending unit 37A for a temperature reading, is filtered by filter 51, and is then routed through hose 84, through valve 46 and back into the engine through hose 86.

Tank 57 acts as a reservoir for coolant during a cooling system contamination removal process. There are three hoses that connect to said tank. Two of the hoses provide flow to the tank from the cooling system of the engine and the third hose vacuums the contents of tank 57. Cooling process input hose 91 having cooling process input hose connector 91J is attached to thermostat adapter 135 (see FIG. 8B), and enables the flow of coolant from the engine to reach tank 57. Cooling process overflow hose 92 having cooling process overflow hose connector 92K is attached to radiator adapter 120 (see FIG. 7A) and provides a means for excess output coolant flow to be routed back to tank 57. This prevents over-pressurization of the cooling system of the engine. Internal pressure line 93 connects the vacuum source created at pump 56 with tank suction hose 94 and screen 95 (see FIG. 1). As hose 91 provides flow to tank 57, pump 56 vacuums coolant from tank 57, via hoses 94 and 93. When coolant enters pump 56 at the suction port thereof, sending unit 35A monitors the temperature of the fluid and displays the reading on temperature gauge 35. Pump 56 then pumps the coolant back to the radiator. As the coolant flow exits pump 56 at its compression port, the pressure of the fluid is displayed on pressure gauge 34 via internal pressure line 76. Cooling process output hose 90 extends from pump 56 to cooling process output hose connector 90H. Connector 90H is attached to adapter 120 (see FIG. 7A) to provide flow of coolant to the radiator. When the radiator is full, or when pressure builds up within it, the flow of coolant from hose 90 then takes the path of least resistance and returns to tank 57 via hose 92.

Figure 6A:
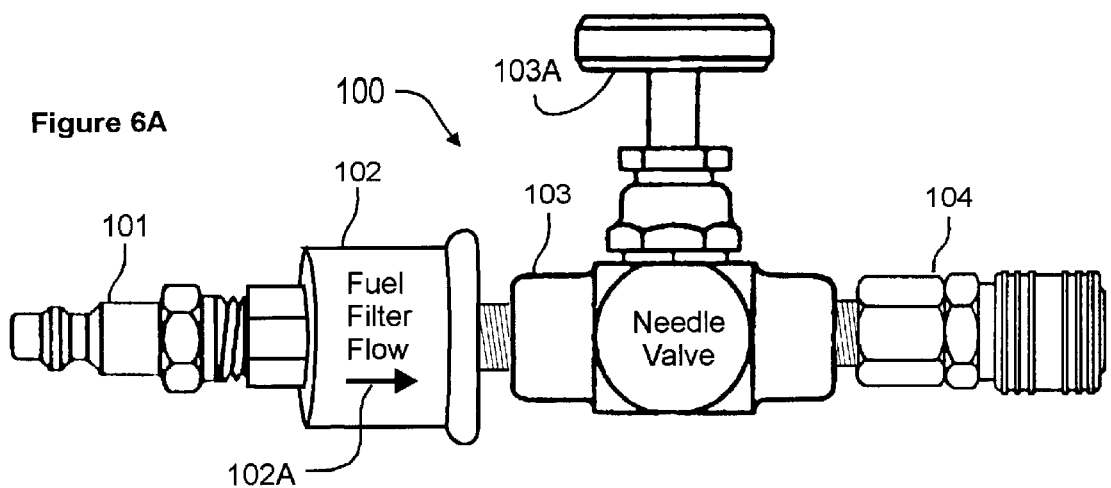
FIG. 6A is a side elevational view of a fuel process adapter of this invention.

Fuel process flow control valve assembly 100 is depicted in FIG. 6A. Flow control valve 100 includes quick coupling plug 101 which screw threadedly engages fuel filter 102. Arrow 102A indicates the direction of fuel flow. Fuel filter 102 screw threadedly engages fuel flow control valve 103 having adjustment knob 103A, and valve 103 screw threadedly engages quick coupling socket 104. Valve 100 is attached to connector 89G to control the flow of fuel injected to an engine during a fuel process.

Figure 6B:
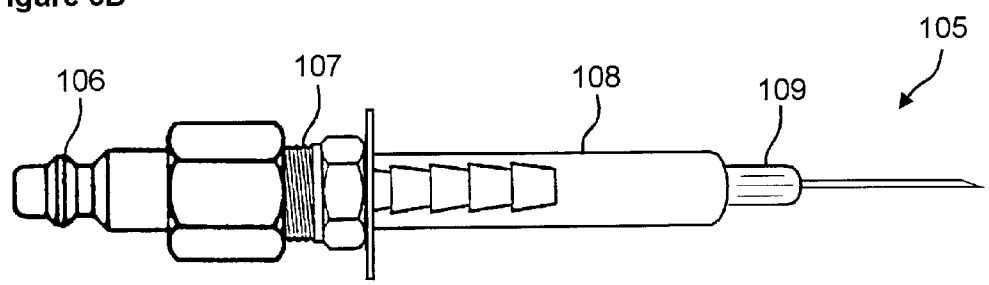
FIG. 6B is a side elevational view of a novel fuel injection needle adaptor assembly.

FIG. 6B depicts a fuel injection needle assembly 105. Injection needle 105 includes quick coupling plug 106 and hose barb 107, the latter of which is inserted into the open end of a plastic transparent hypodermic syringe 108 having hypodermic needle 109 removeably attached thereto. Before inserting barb 107 into syringe 108, syringe 108 is heated for a minute in a cup of warm (140° F.) water to soften the plastic body of the syringe. After inserting barb 107 into syringe 108, said syringe is slowly rolled between fingers and thumb until it cools to ambient temperature. This ensures a positive seal between barb 107 and syringe 108. Injection needle 105 is used to inject fuel cleaner into the intake system of an engine when connected to flow control valve 100.

Figure 6C:
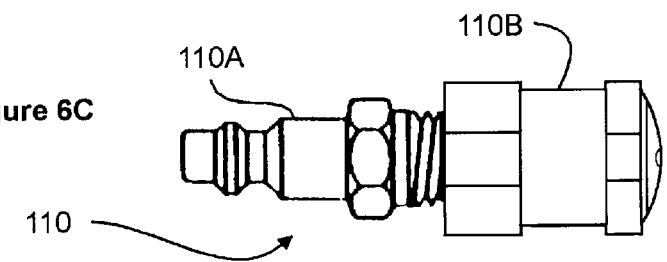
FIG. 6C is a side elevational view of the novel mister nozzle adaptor assembly.

FIG. 6C depicts a mister nozzle assembly 110. Mister nozzle 110 includes a quick coupling plug 110A threadably attached to a conventional, commercially available mister nozzle 110B. Mister nozzle assembly 110 atomizes fuel cleaner into small droplets, forming a cone-shaped pattern, and in a preferred embodiment has a flow capacity of about one (1) gallon per hour. Assembly 110 is connected to flow control valve 100 before use.

Figure 6D:
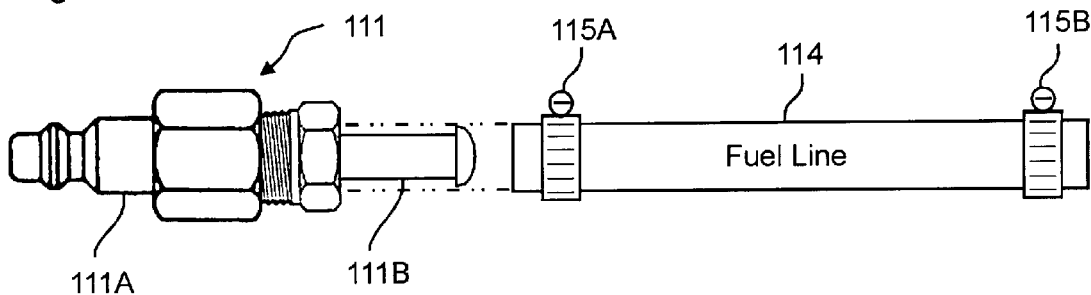
FIG. 6D is a side elevational view of a novel fuel line adaptor assembly.

Fuel line coupler 111 is depicted in FIG. 6D; it is used to connect hoses 88 and 89 to the fuel system of a diesel engine. Coupler 111, which may be provided in differing diameters depending upon the application, includes a quick coupling plug 111A threadably attached to a conventional "one-barb reusable" hose barb 111B for engagement with fuel line 114 which carries hose clamps 115A, 115B. The diameter of fuel line 114 varies with the application.

FIG. 7A provides an exploded view of radiator adapter assembly 120. Base 121 has an internally threaded bore on a first side thereof for screw threadedly engaging externally threaded bushing stem 122 as shown. Bushing 123 has an internally threaded central bore and is threadedly secured to stem 122. The external surface of bushing 123 is knurled to facilitate holding radiator hose 125 when said hose is pushed onto said external surface and clamped into place with hose clamp 126B. O-ring 124 provides a seal where bushing 123 abuts base 121. Clamp 126A clamps hose 125 to the neck of the radiator.

Bushing 123 and hose 125 are made in differing sizes to accommodate radiator hoses of differing sizes.

FIG. 7B provides a top plan view of radiator adapter 120 having base 121. Internally threaded bores 131 and 132 are formed in base 121 at a 90° angle to one another. A quick coupling plug is inserted into bore 131 to form a cooling output hose connection 128. Output connector adapter 130 is optionally available to attach to connection 128, to switch connection 128 from an external plug to an internal socket. The need for this reversal is explained in the operation of the invention section of this disclosure.

A quick coupling plug is also inserted into bore 132 to provide a cooling overflow hose connection 127. Overflow connector plug 129 is optionally available to attach to connection 127, to block flow from exiting connection 127. The need for this plug is explained in the operation of the invention section of this disclosure.

Figure 8A:
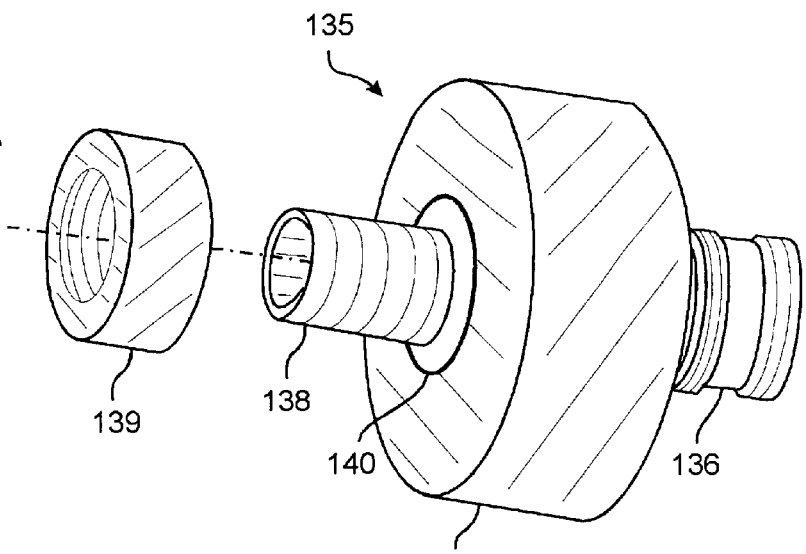
FIG. 8A is an exploded view of the novel thermostat adapter assembly.

FIG. 8A provides an exploded view of thermostat adapter assembly 135. Body or base 137 is centrally bored along its longitudinal axis. A first set of threads is formed in a first end thereof to engage threaded bushing stem 138 and a second type of threads is formed in the opposite end thereof to engage quick coupler 136. Centrally bored, internally threaded bushing 139 is removably attached to stem 138. The external surface of bushing 139 is knurled to better secure a radiator hose (not shown) that is pushed onto said external surface and clamped into place. A liquid tight seal is provided by the clamping. O-ring 140 provides the needed seal where bushing 139 abuts base 137.

Bushing 139 is made in several sizes to accommodate different size radiator hoses.

Figure 8B:
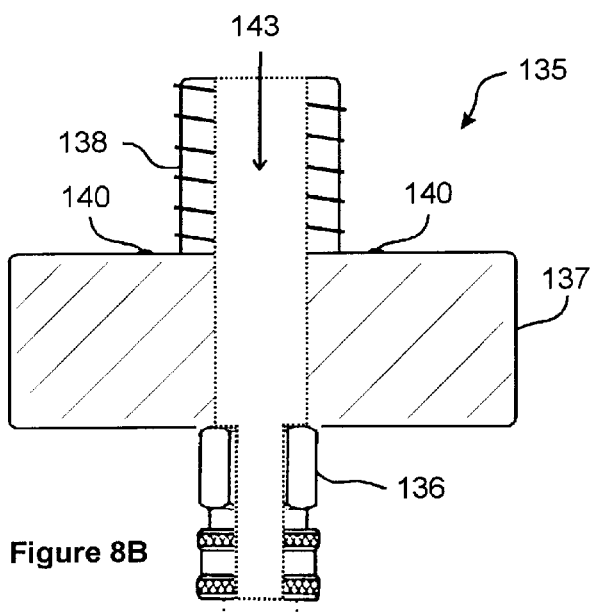
FIG. 8B is a top plan view of the novel thermostat adapter assembly and alternate connector.

FIG. 8B depicts thermostat adapter 135 in side view; note bore 143 formed in base 137. Cooling input hose connection socket 136 is threadably attached to the bottom side of base 137, for connection to hose 91 during a cooling process. Input connector adapter 134 is optionally available to attach to connection 136, to switch connection 136 from an internal socket to an external plug. The need for this reversal is explained in the operation of the invention section of this disclosure.

Figure 8C:
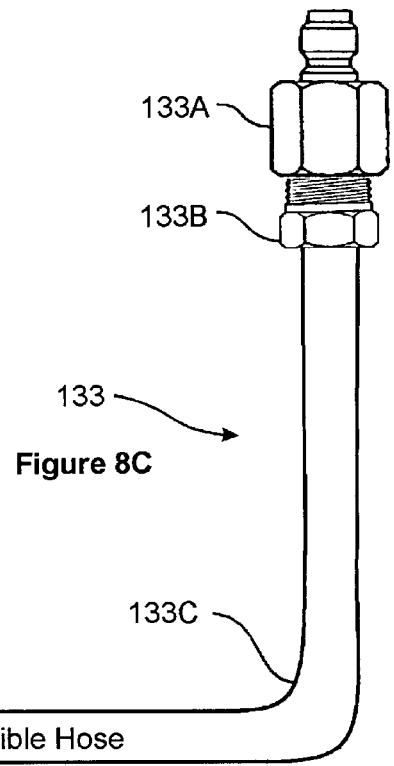
FIG. 8C is a side elevational view of the novel cooling process external vacuum hose.

A side view of cooling process external vacuum hose assembly 133 is provided in FIG. 8C. Assembly 133 includes a quick coupling plug 133A that threadedly receives a "push-on/snap-tight" hose fitting 133B. Vacuum hose 133 is used to remove coolant from the radiator and coolant overflow tank of an engine, before beginning the novel cooling process. The quick coupling end of vacuum hose 133 is temporarily attached to tank 57 in place of hose 94, thereby allowing a technician to lower the level of coolant within the radiator before disconnecting any radiator hoses, to save time and to prevent coolant spillage.

Figure 9A:
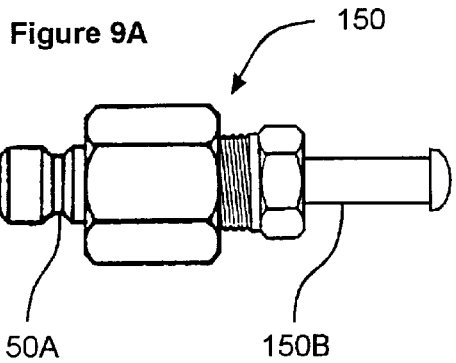
FIGS. 9A–9D are side elevational views of the novel transmission process adapters.
Figure 9B:
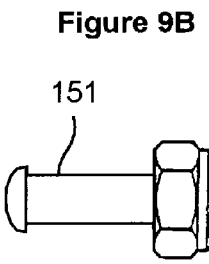
Figure 9C:
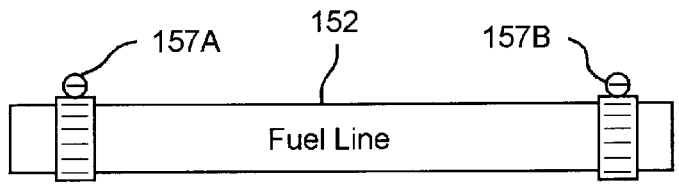

FIGS. 9A–D provide side views of all transmission kit adapters. These adapters are used with hose 80 to remove transmission fluid from an automatic transmission. FIG. 9A depicts transmission line coupler 150 having a quick coupling plug 150A and a single barbed hose barb 150B. FIG. 9B depicts a transmission line fitting 151 including a single barbed hose barb with inverted flare threads. FIG. 9C depicts fuel line 152 and hose clamps 157A and 157B which are provided with coupler 150 and fitting 151. The parts depicted in FIGS. 9A–9C are provided in several different sizes to accommodate the differing diameters of transmission cooling line adaptors. The above is used to connect hose 80 with the cooling lines of a transmission. Most transmission lines have a rubber hose section somewhere along their lengths that can be disconnected for coupler 150 to be used. If such connection is not possible, the fitting where the cooling lines are attached to the radiator may be disconnected, and fitting 151 is used. Fuel line 152 and clamps 157A and 157B are provided to connect fitting 151 to coupling 150, for final connection to hose 80.

Figure 9D:
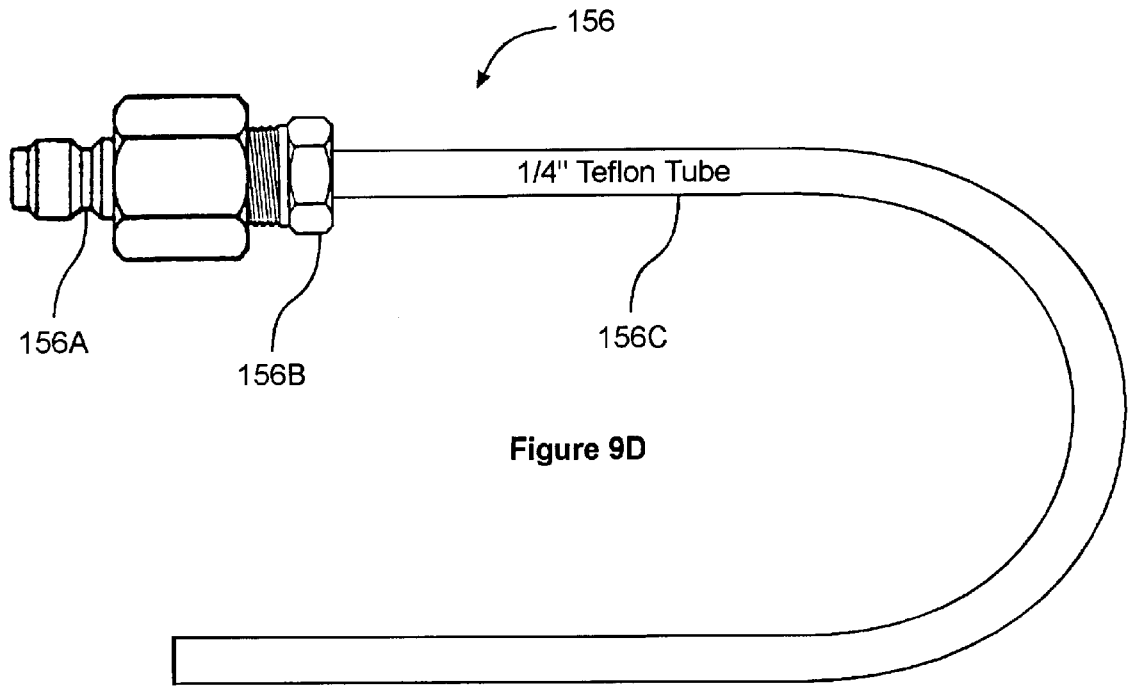

Transmission fluid vacuum hose assembly 156 is depicted in FIG. 9D. Said assembly includes a quick coupling plug 156A threadably attached to "push-on/snap-tight" type of hose fitting 156B, into which a preselected length of teflon tubing 156C having a preselected internal diameter is inserted. Transmission vacuum hose assembly 156 is attached to hose 80 by said quick coupler fitting, and is used to remove transmission fluid prior to removal of the transmission pan. Transmission vacuum hose 156C is flexible, so that it may be inserted into a dipstick tube and reach the bottom of a transmission fluid pan.

An exploded view of oil filter adapter 160 is provided in FIG. 10A. Bore 176 extends partially through base 166 and communicates with center hole 168 which receives bushing 161. O-ring 167 surmounts base 166 and provides a liquid tight seal when base 166 abuts oil filter gasket surface 165 of an engine block. Throughbore 174 is formed in the cylindrical side wall of base 166 and is adapted to engage an engine process input hose connection coupler 173. Bushing 161 includes internal threads 163. The outer periphery of the proximal end of bushing 161 is left smooth or may be knurled for easier handling, and the outer periphery of the distal end is externally threaded. Oil filter cap 169 has internal threads 170 that engage threads 162 of bushing 161. 0-ring 171 surmounts cap 169 and provides a liquid tight seal between cap 169 and base 166. The bottom of cap 169 is bored and adapted to receive a quick coupling plug 172.

Bushing 161 is made in a variety of sizes to fit different engines because engine stem 164 varies in size depending upon the engine model.

To use adapter 160, a technician selects a proper size bushing 161 and threads it onto stem 164. Base 166 is then slid over bushing 161 with connection 173 positioned so that hose 83 may connect without being obstructed, and cap 169 is threaded onto the protruding portion of bushing 161. When cap 169 is securely tightened by hand, a liquid tight seal is provided by O-ring 167 where gasket surface 165 abuts base 166, and by O-ring 171 where base 166 abuts cap 169. When an engine is started, oil from its oil pump enters adapter 160 via oil passageway 175, travels through bore 176 and exits adapter 160 via connection 173 (arrow 177). After oil is processed by machine 20, it returns to adapter 160 via hose 86 which is attached to connection 172 (arrow 179). Oil then flows through bushing 161 and stem 164, and enters an the main oil passageway 178 of the engine.

Oil filter cap adapter 185 is used if room in the engine compartment is limited. Adapter 185 is attached to connection 172 so that hose 86 can be attached to adapter 185.

FIG. 10B is a cross-sectional view of oil filter adapter plate 180 which is used if gasket surface 165 is larger than the sealing capabilities of O-ring 167. In that case, oil filter adapter plate 180 is installed immediately after bushing 161 and is held in place by base 166. Plate 180 has center bore 183 formed therethrough and supports O-ring 184 which abuts gasket surface 165. Base 166 and O-ring 167 seal against plate 180, at inside surface 182.

Figure 11:
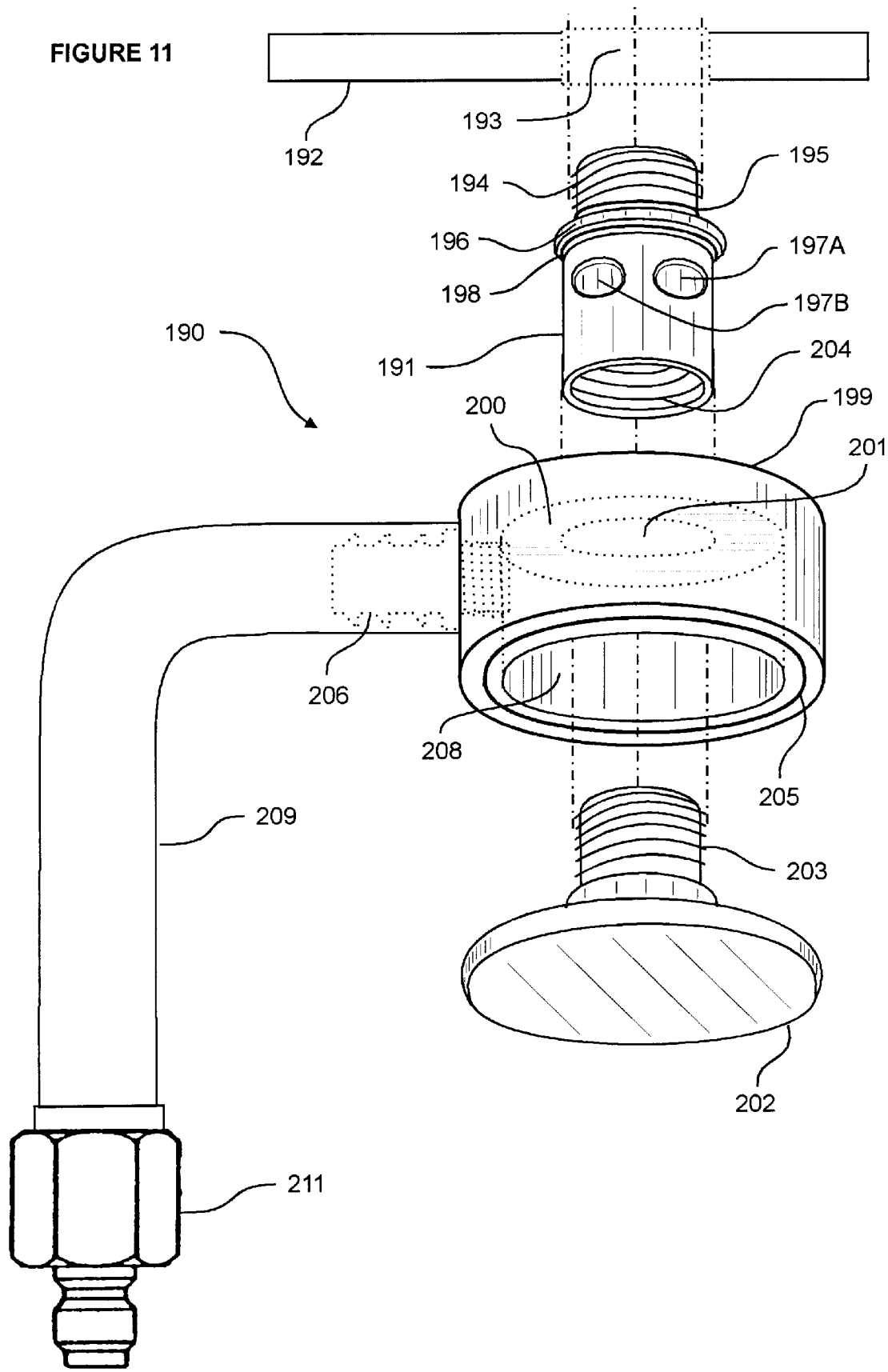
FIG. 11 is an exploded perspective view of the novel drain plug adapter.

An exploded view of novel drain plug adapter assembly 190 is provided in FIG. 11. Drain plug bushing 191 has one threaded end 194. Unthreaded ridge 196 support O-ring 195. Four apertures are formed in the opposite end, only two of which, denoted 197A and 197B, are indicated in FIG. 11. O-ring 198 fits against the underside of ridge 196. Internal threads 204 are formed in said opposite end of bushing 191.

Since there are a variety of thread sizes for oil pan drain plugs, bushing 191 is modified and produced in many different sizes to accommodate various drain plug sizes.

A first end of drain plug base 199 is center bored to form opening 201 having a first diameter and a second end thereof is bored to form opening 208 having a second diameter greater than said first diameter, thereby creating annular shoulder 200. O-ring 205 is positioned on base 199 where depicted. Hose barb 206 is in screw threaded engagement with drain plug base 199 and extends radially therefrom as depicted. Flexible chemical hose 209 is attached to said barb, which is of the "push-on/stay-put" type. Quick coupling socket connector 211 is attached to the distal free end of hose 209, for connection to hose 80 during an engine process.

Drain plug cap 202 has a disk-shaped lid and an externally threaded stud 203 that screw threadedly engages internal threads 204 of bushing 191 when the parts of FIG. 11 are assembled to one another. The outer periphery of the disk-shaped lid is knurled to facilitate its manual tightening.

Bushing 191 is inserted into drain plug opening 193 of oil pan 192; O-ring 195 provides a liquid tight seal for this union. Base 199, with hose 209 secured thereto, is then placed over bushing 191. Cap 202 is hand tightened into bushing 191, which protrudes into center bore 208; O-ring 205 provides a liquid tight seal for such union. Connector 80A of hose 80 is then attached to connection 211 of adapter 190.

Figure 12:
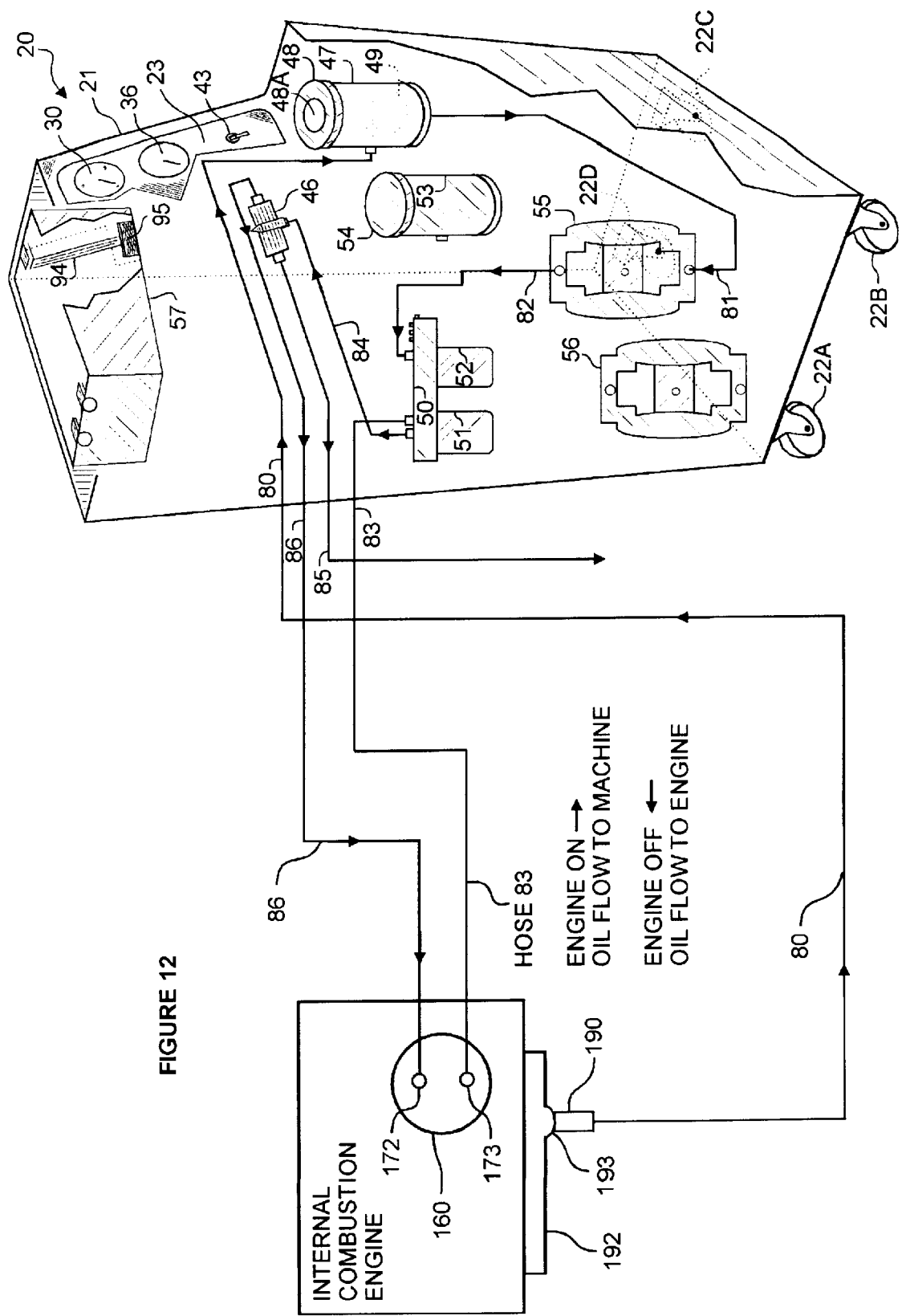
FIG. 12 diagrammatically depicts the hose hook-up and three-way switch setting for removing contamination from the oil system of an engine.

The hose connections and flow patterns for an oil system cleaning are shown in FIG. 12. Hoses 80, 83, and 86 are disconnected from bracket 26 of machine 20 and connected to oil pan drain plug adaptor 190, and oil filter adaptor 160 at input connection 173 and output connection 172, respectively. With the engine off, switch 43 is thrown to the "on" position to activate pump 55 with air pressure regulated by regulator 41 (FIG. 2). Pump 55 creates a vacuum that draws fluid from the engine through adapter 190, hose 80, tank 47, check screen 49, and into pump 55 via internal pressure line 81. Fluid is then pressurized from pump 55, via line 82, into filter block 50. After block 50 processes the fluid (as described above in connection with FIGS. 4A and 4B), said fluid has two flow routes to follow. The first is through hose 83, port 173, and in a direction considered as reverse flow, through the oil pump and pick-up screen of the engine, finally draining into oil pan 192 to be re-circulated again. Since the tolerances within the flow path of the oil pump are generally tight in a good pump, excessive back pressure will be created because the volume produced by oil pump 55 is much greater than the maximum volume that can be handled by a good oil pump. This excess flow is routed from block 50 to line 84, which is in fluid communication with hose 86 and port 172 when process selection valve 46 is in position C. From port 172, the fluid flows into the main oil galleries of the engine. All of the internally lubricated parts receive oil from said galleries; after lubrication, the oil drains back into oil pan 192 for re-circulation. With the connections and flow paths just described, machine 20 vacuums oil from the oil pan, filters the oil, monitors its temperature, monitors different pressures of the fluid, and re-circulates the fluid as desired.

Figure 13:
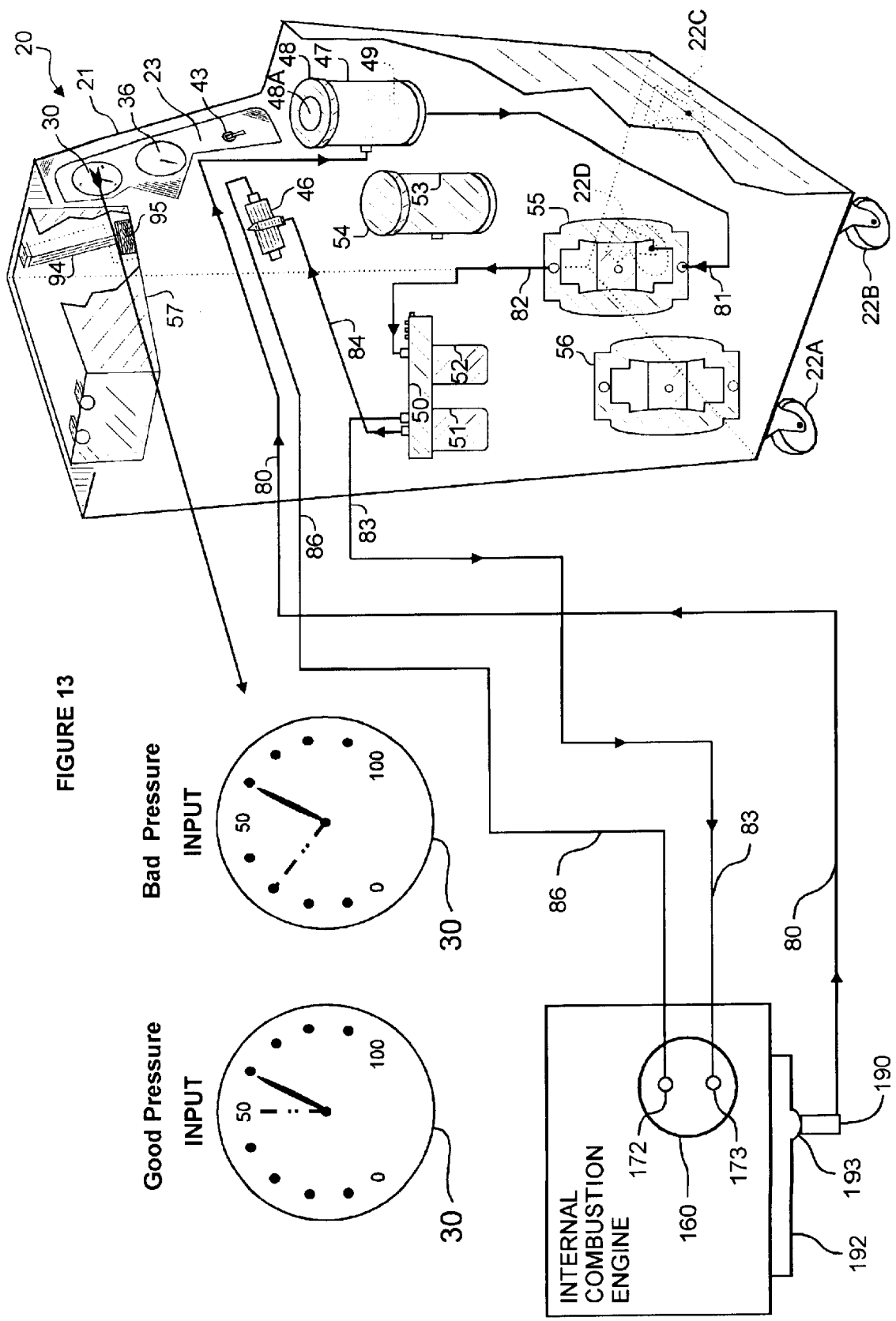
FIG. 13 diagrammatically depicts the hose hook-up and three-way switch setting for performing a mechanical analysis test that checks the condition of an engine oil pump and pick-up screen.

As best understood in connection with FIG. 13, the mechanical condition of the oil pump is checked by observing the back pressures created from the tolerances within the gears of the oil pump. The hose connections are similar to that of FIG. 12, with the exception that valve 46 is turned to the back-flush position, which cuts off flow through hose 86 from block 50. Fluid flow is induced in the same manner as described in FIG. 12. With the isolation of flow to only the oil pump passageways, the volume of oil expelled by pump 55 is restricted by the tolerances in the gears of the oil pump. If the engine has a bypass valve (of the type that is designed to open at a pre-set pressure to supply oil to the main oil journal in the event the oil filter becomes clogged) installed in the block (a majority of the bypass valves are in the oil filter instead of in the engine), the pressure indications on gauge 30 are reduced as partial flow enters the bypass valve and is expelled into the main oil journals. This is evidenced by a pressure indication on gauge 32, which is connected to hose 86 via line 74 intermediate of adapter 160 and valve 46 (FIG. 5). In this circumstance, a suitable blocking plug must be inserted over the opening to this valve in the oil filter mounting area. With fluid flow isolated properly, gauge 30 should show a high reading, or high bounce of the needle, of approximately 60 psi, relative to the specific engine. Between the pulsating strokes of pump 55, the needle drops because fluid is bleeding out between the gears of the oil pump, and then rises again as more fluid is again forced into the oil passageways. To determine the condition of the tolerances, the difference between the high bounce and the low bounce of the needle is observed, which difference is a function of the speed at which the fluid is escaping from the tolerances. A small bounce indicates close tolerances which indicates relatively little wear; a large bounce indicates wear beyond tolerances.

Figure 14:
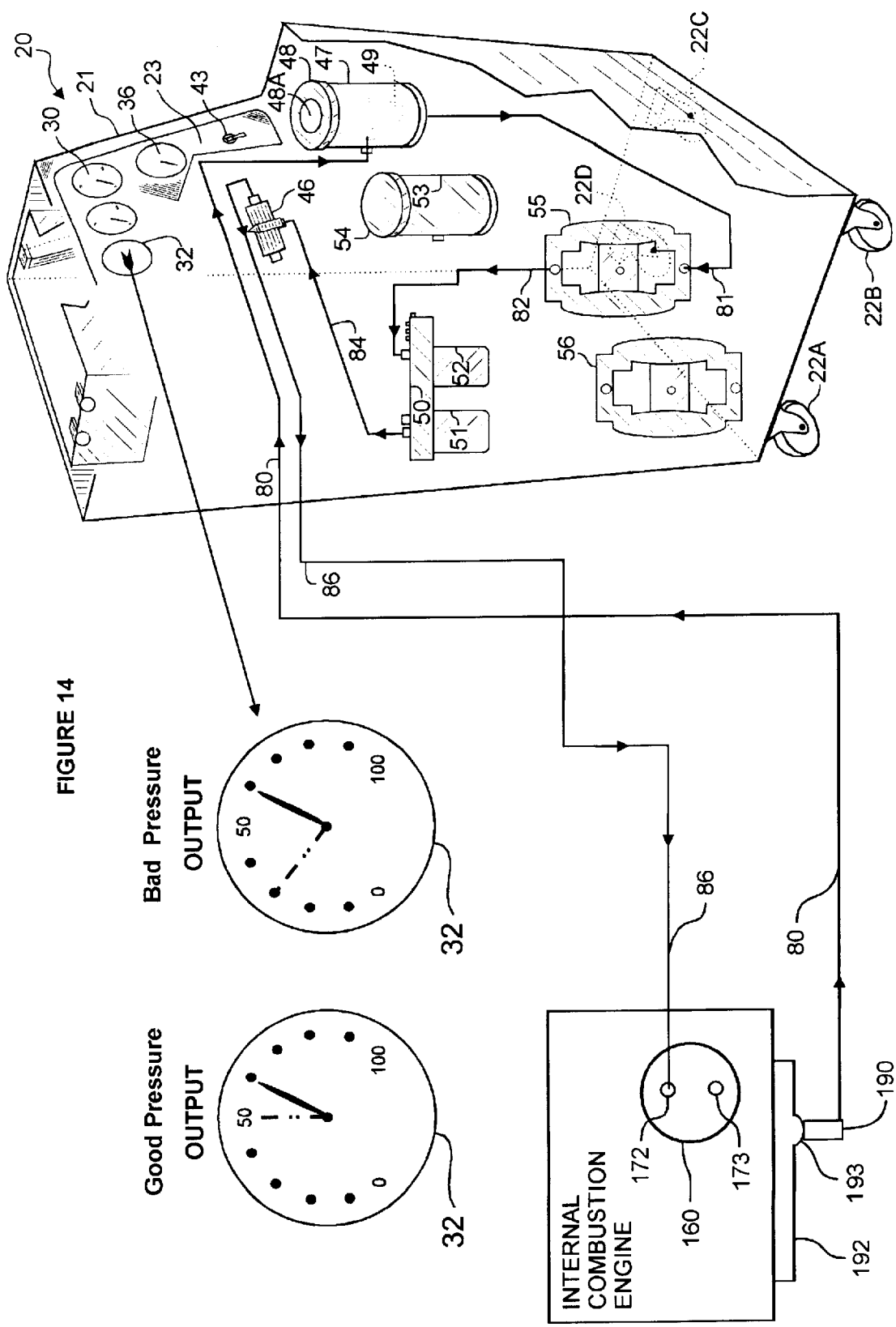
FIG. 14 diagrammatically depicts the hose hook-up and three-way switch setting for performing a mechanical analysis test that checks the condition of the main and rod bearing running clearances of an engine.

The same procedure is used to determine the wear present in the running clearances of the rod and main bearings, as best understood in connection with FIG. 14. Process valve 46 is turned to the "process" position and hose 83 is disconnected from adapter 160 and re-connected to bracket 26 C. Flow is induced in the same manner, and the pressures are indicated by gauge 32.

Figure 15:
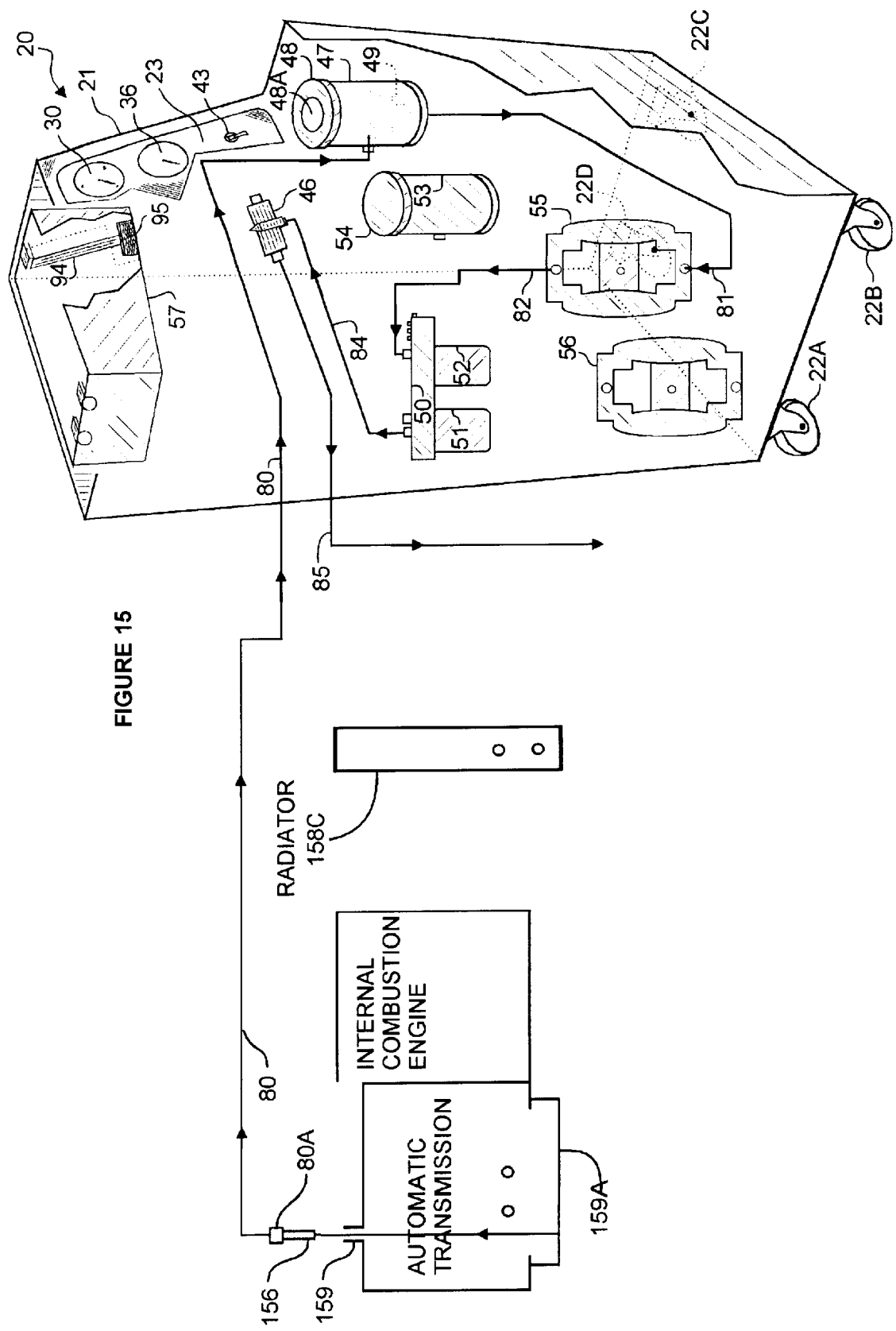
FIG. 15 diagrammatically depicts the hose hook-up and three-way switch setting for the first step of the novel method of removing contaminants from an automatic transmission.

FIG. 15 shows the hose connections for the first step in removing fluid from an automatic transmission. A first end of hose 156 is attached to hose 80 via connector 80A, and the second end of hose 156 is inserted down dipstick tube opening 159 until it contacts the bottom wall of pan 159A. Hose 85 is connected to a suitable waste oil collection system and valve 46 is set to its "purge" position (position C).

Figure 16:
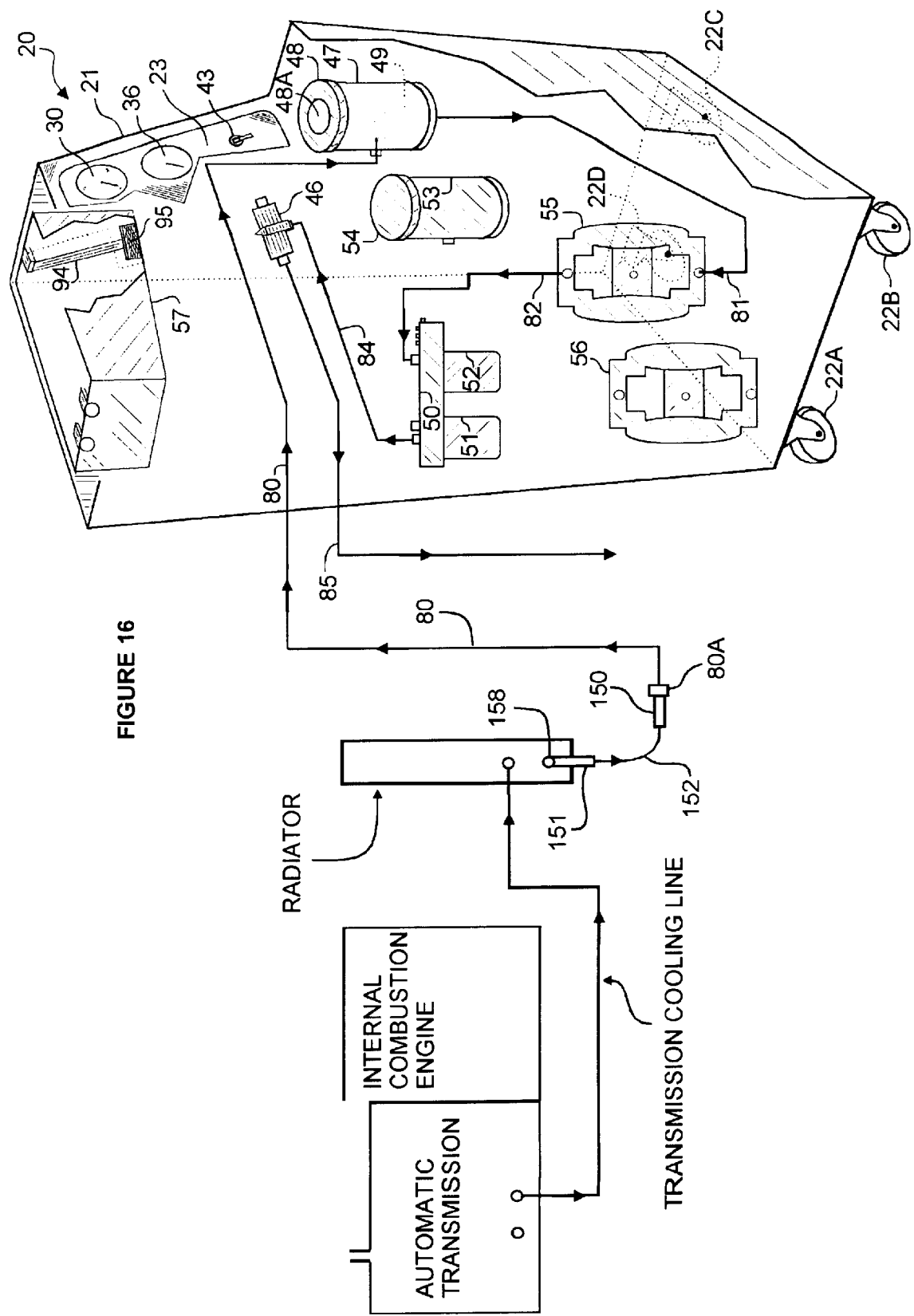
FIG. 16 diagrammatically depicts the hose hook-up for the second step of the novel method of removing contaminants from an automatic transmission.

FIG. 16 depicts the hose connections for the second step in removing fluid from an automatic transmission. A transmission cooling line is threadably removed from the radiator at port 158. Adapter 151 is threadably inserted into port 158. Adapter 150 with hose 152 is attached to hose 80 with connection 80A. Hose 85 is connected to a suitable waste oil collection system and valve 46 is set to position C, the "purge" position.

Figure 17:
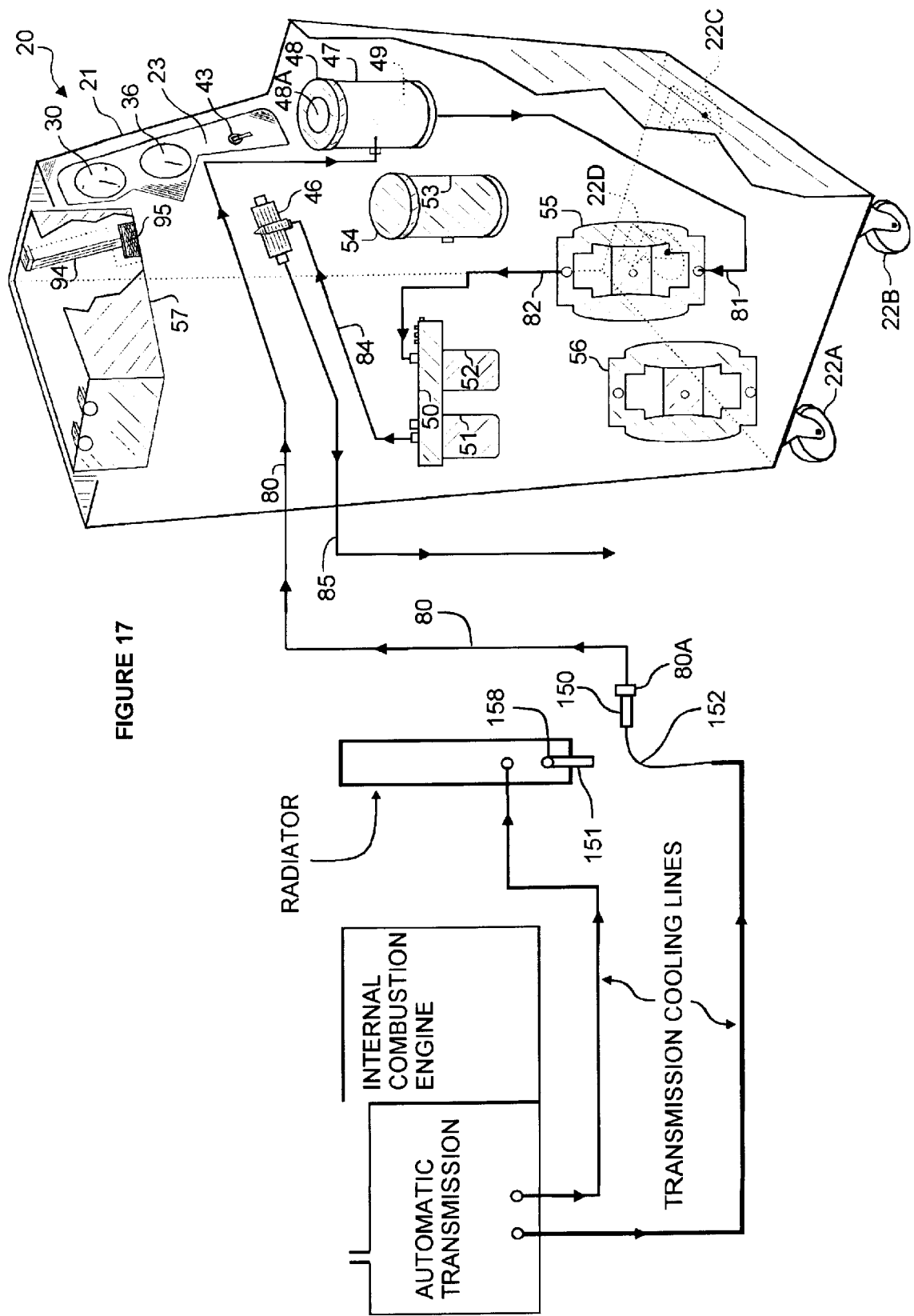
FIG. 17 diagrammatically depicts the hose hook-up for the third step of the novel method of removing contaminants from an automatic transmission.

FIG. 17 shows the third step in removing fluid from an automatic transmission. Adapter 150 with hose 152 has been removed from adapter 151 and re-attached to the disconnected transmission cooling line.

Figure 18:
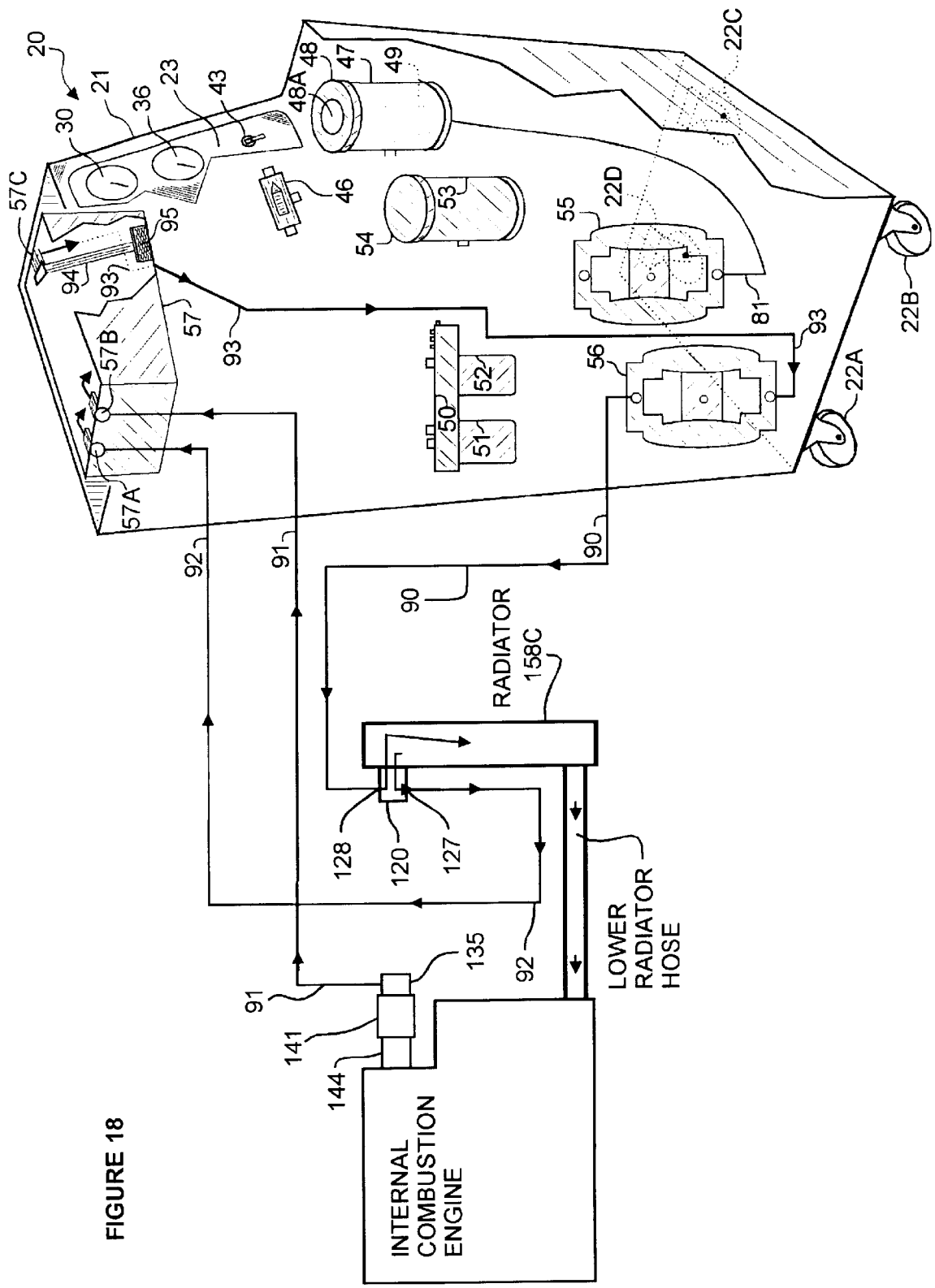
FIG. 18 diagrammatically depicts the hose hook-up for removing contaminants from the coolant system of an engine.

FIG. 18 depicts the hose connection points for accomplishing a cooling process. Top radiator hose 141 has been disconnected from the radiator and adapter 135 has been installed into it as described above in connection with FIG. 8A. Hose 91 is connected to adapter 135 to provide fluid communication to tank 57, via port 57B, when the engine thermostat opens. Adapter 120 has been installed onto the radiator neck as described in FIG. 7A. Hose 90 is connected to adapter 120 to provide fluid communication between pump 56 and radiator 158C. Hose 92 is attached to adapter 120 to direct into tank 57 any excess flow from pump 56 to radiator 158C. Hose 92 provides over-pressurization protection to the cooling system of the engine.

Figure 18A:
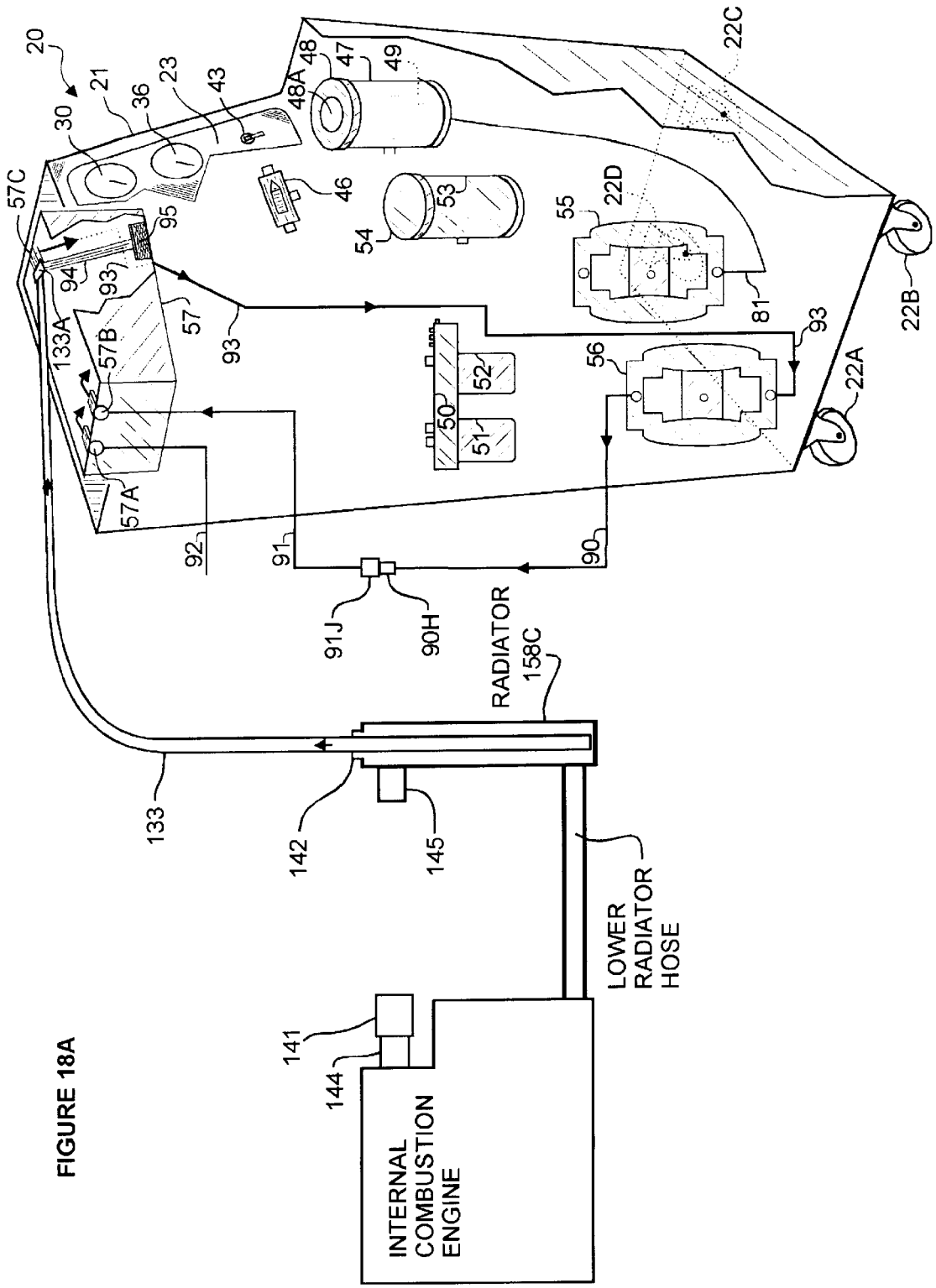

FIG. 18A illustrates an extraction method of removing coolant from radiator 158C with hose 133, and cycling the removed coolant into tank 57 for further use.

Figure 18B:
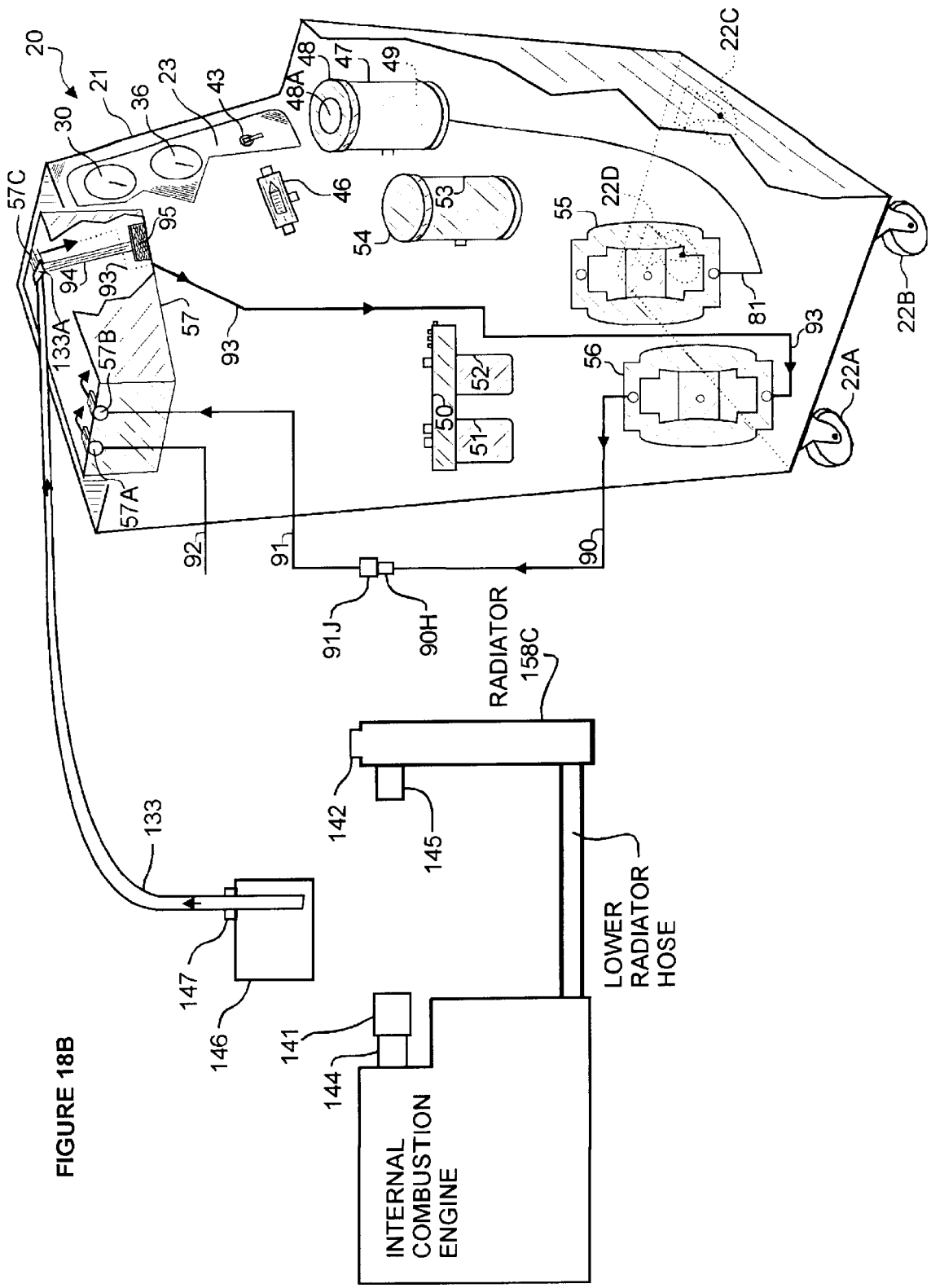

FIG. 18B illustrates an extraction method of removing coolant from cooling reservoir 146 with hose 133, and cycling the removed coolant into tank 57 for further use.

Figure 19:
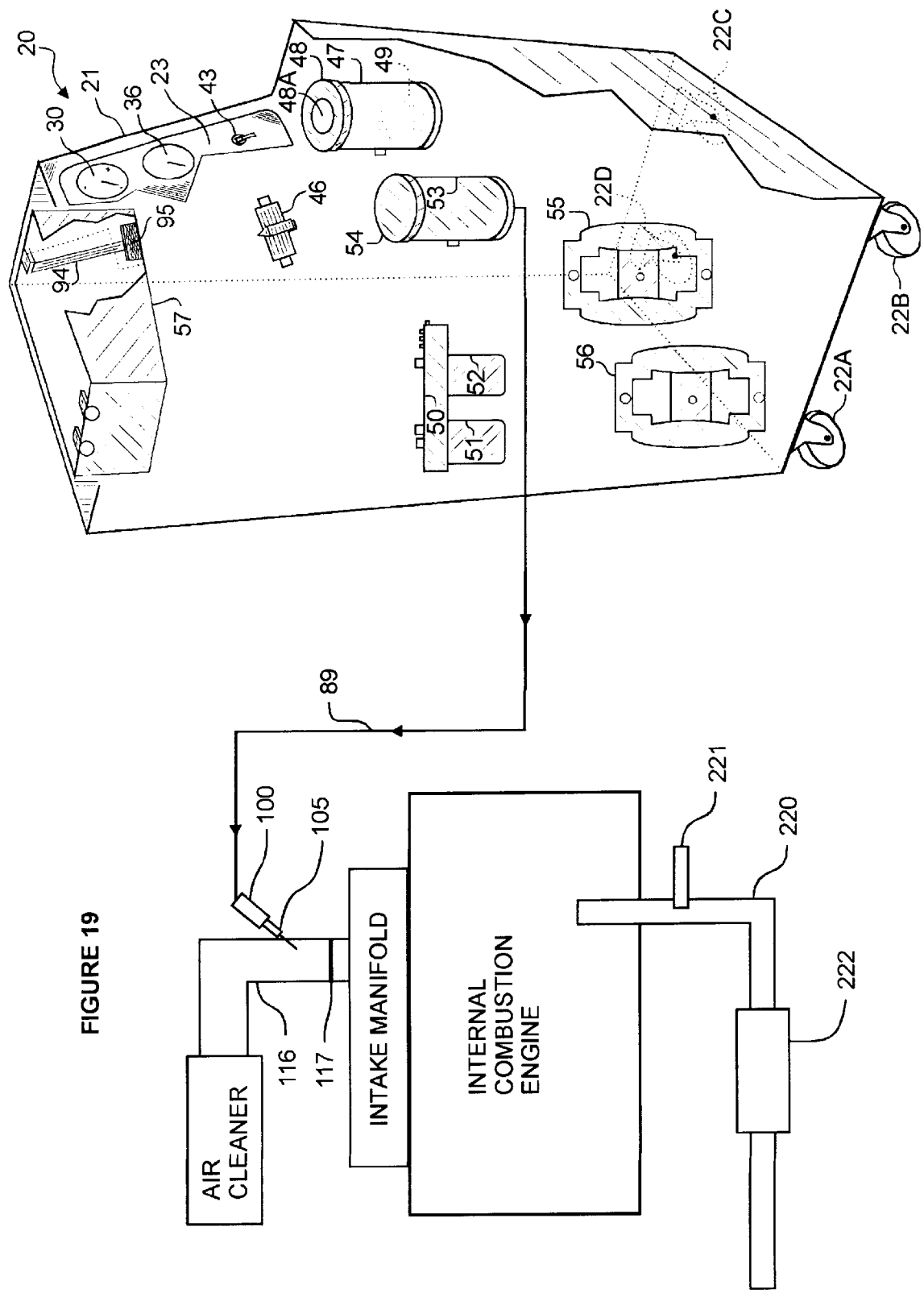
FIG. 19 diagrammatically depicts the hose hook-up for the novel method of using a hypodermic needle for removing contaminates from the fuel system of a gasoline engine.

FIG. 19 shows the position that adapter 105 must be inserted into air flow tube 116 to spray cleaner directly on throttle plate 117. Adapter 105 is coupled to control valve 100 which in turn is attached to hose 89 which is in fluid communication with tank 53. A predetermined air pressure, indicated by gauge 39, is set with regulator 42. Switch 44 is thrown to open said pressure to tank 53 and hence to adapter 105, thereby supplying adapter 105 with the appropriate cleaner for conducting a fuel and emissions cleaning process.

Figure 20:
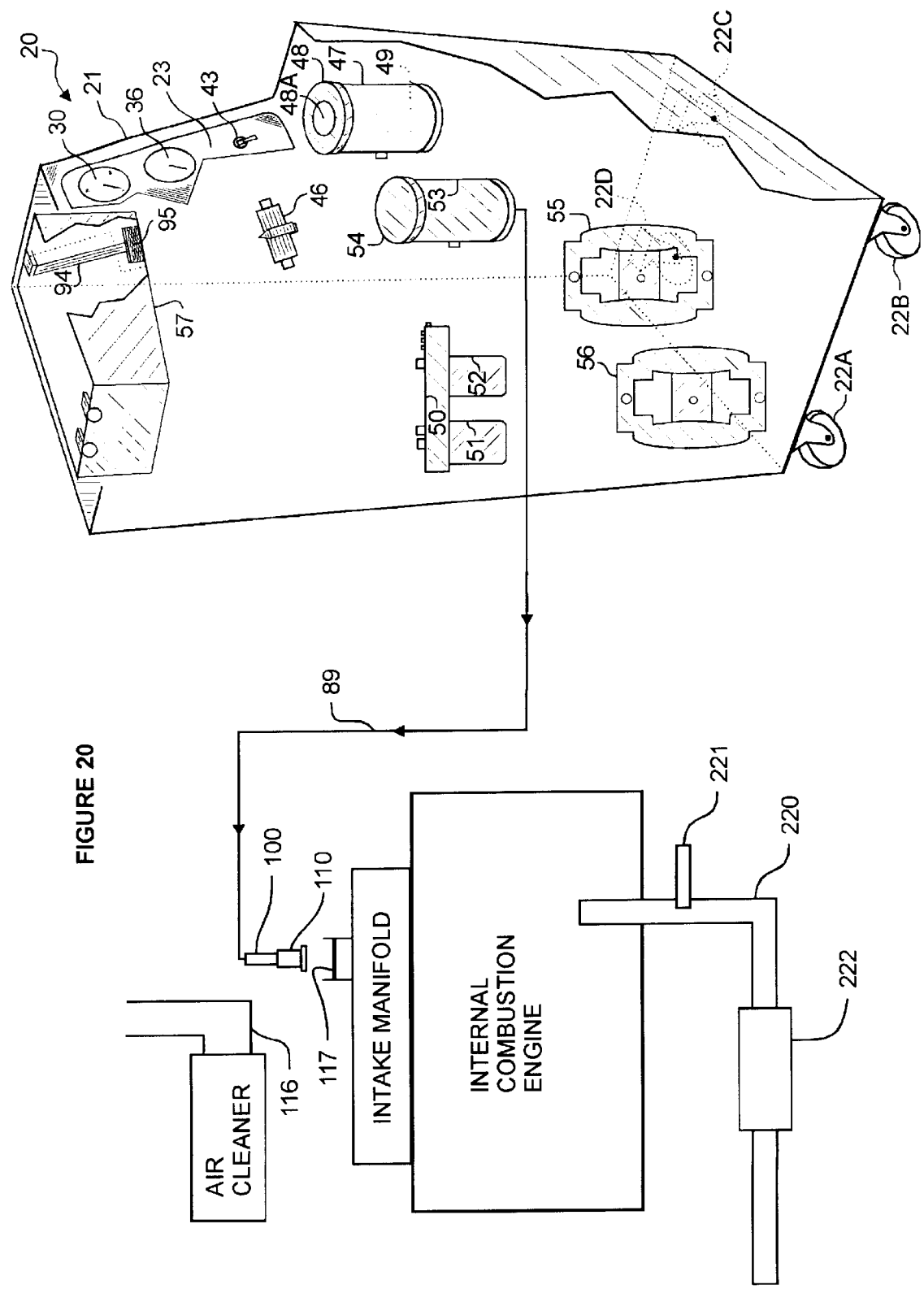
FIG. 20 diagrammatically depicts the hose hook-up for the novel method of using a mister nozzle for removing contaminates from the fuel system of a gasoline engine.

FIG. 20 shows an arrangement similar to that of FIG. 19 for conducting a fuel and emissions cleaning process. In this example, air flow tube 116 has been removed from the intake manifold to expose throttle plate 117, and adapter 110 is coupled to valve 100. As cleaner flow is induced in the same manner as described in connection with FIG. 19, a spray pattern is directed at said throttle plate 117.

The cleaner includes a hydrocarbon liquid and its structure is such that nascent oxygen is released into the exhaust stream shortly after the cleaner enters the combustion chamber, i.e., a chemical transformation of the cleaner occurs due to the conditions in the combustion chamber and nascent oxygen is a byproduct thereof. The nascent oxygen flows over the oxygen sensor of the engine and through the catalytic converter; it creates secondary combustion when reacting with unburned or partially burned particulate matter including hydrocarbons. The secondary combustion transforms the particulate matter into carbon dioxide and water.

The flow of nascent oxygen over the oxygen sensor removes unburned or partially burned particulate matter that clogs the vents of the oxygen sensor. This allows the exhaust gases flowing through the oxygen sensor to contact the ceramic tip of the oxygen sensor, just as when the engine was new; the sensor therefor sends accurate information about the oxygen content of the exhaust gases to the vehicle's computer so that the fuel-air ratio can be optimized.

Nascent oxygen also flows into the catalytic converter to initiate secondary combustion of built-up particulate matter within said converter. After a certain amount of particulate matter has been removed from the reaction metal surfaces within the converter, secondary combustion begins within the converter in accordance with its function before it became contaminated. The reaction continues until all of the damaging particulate matter has been removed and the converter is restored to its original operating efficiency.

Figure 21:
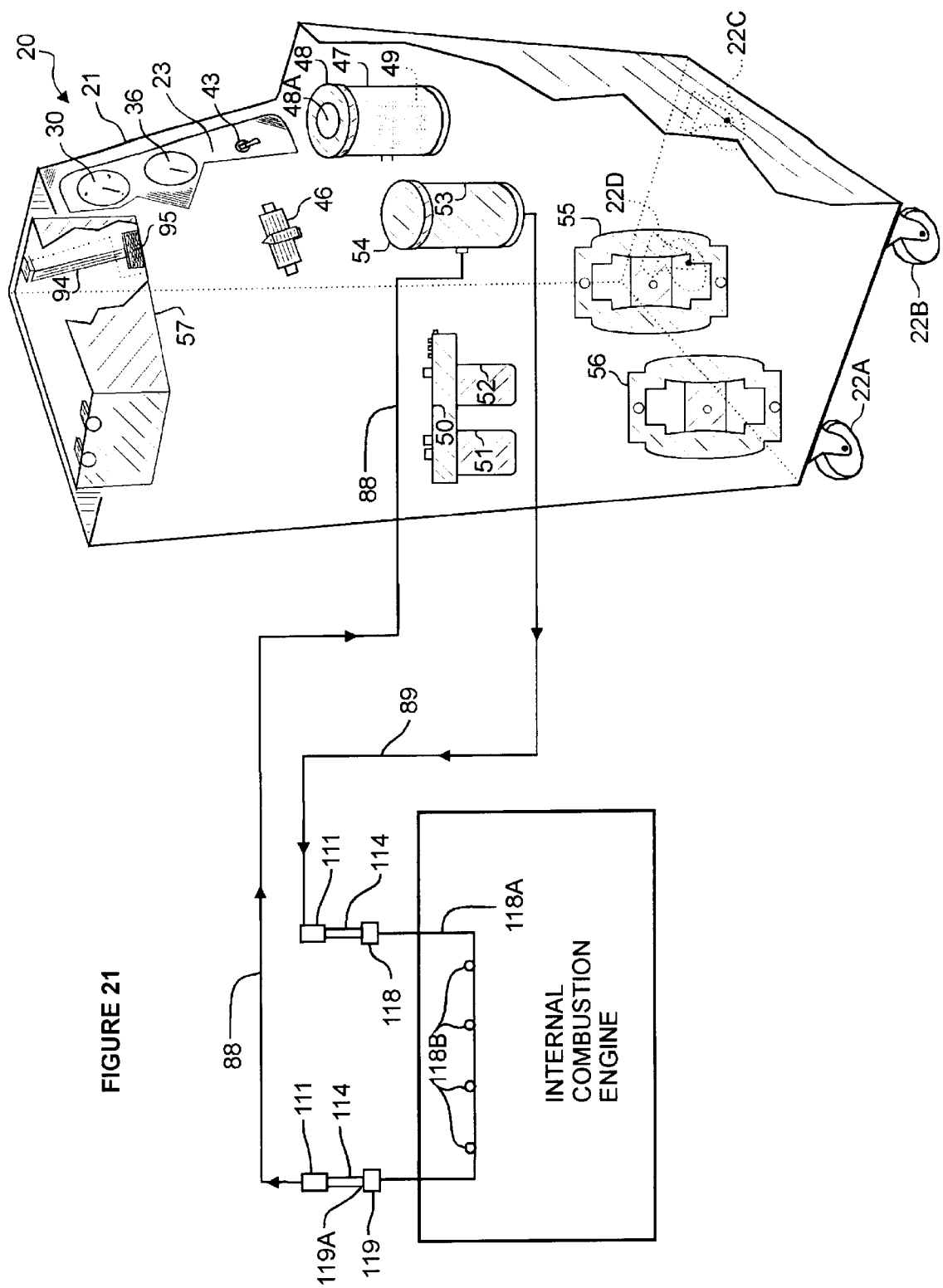
FIG. 21 diagrammatically depicts the hose hook-up for removing contaminates from the fuel system of a diesel engine.

FIG. 21 illustrates the hose connections for performing a diesel fuel cleaning process. Tank 53 is put into fluid communication with fuel injectors 118B. Hose 89 is attached to fuel pump 118 in place of its originally connected fuel line (not shown) with adapter 111 and 114 as described in connection with FIG. 6D. Hose 88 is attached in the same manner to a port 119A of a fuel pressure regulator 119. Lid 54 is removed and a predetermined amount of diesel system cleaner is added to tank 53. Lid 48 is then placed over tank 53 and secured with only one of its engaging threads. This allows observation of the contents of tank 53 and also allows air to enter tank 53 as cleaner is consumed by the engine.

Figure 22:
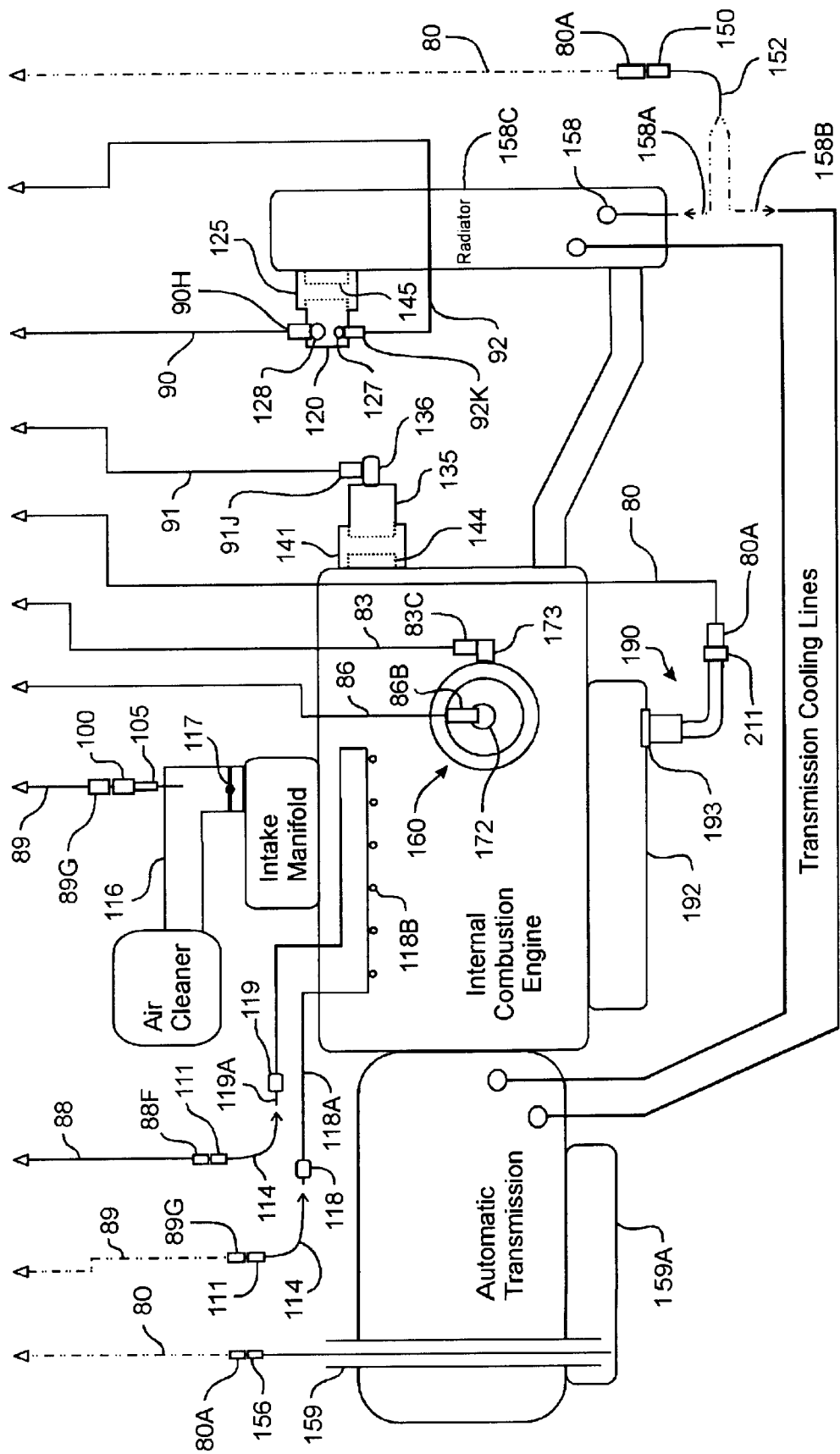
FIG. 22 is an all-inclusive schematic diagram of an engine and transmission with the novel process adapters and hoses connected thereto.

FIG. 22 is a composite view that indicates all of the hose hook-ups of FIGS. 12–21.

Operation of Invention

Novel machine 20 performs several different processes. Each process may be performed separately, or several processes may be performed in conjunction with other processes; for example, the engine oil system process, the cooling process, and the fuel/emissions process may all be performed at the same time. The transmission process is performd separately, because unlike the other processes, it is a "static" process, i.e., the engine is not running when the transmission process is performed. In the description of the preferred method of each process, a gasoline operated automobile engine is assumed for exemplary purposes. The novel processes are performed in an automotive service facility equipped with a vehicle lift, a waste oil tank, a compressed air supply capable of delivering at least 10 cfpm of clean, dry air, and common hand tools. No special tools or skill level is required, and a person capable of performing routine maintenance on an automobile engine is capable of learning and performing all of the novel processes.

Machine 20 is first connected to an air supply at coupler 87E (FIG. 6).

Engine Oil System Cleaning (FIG. 12)

To prepare the engine oil process hook-up, a vehicle is first elevated on a lift. The oil drain plug in opening 193 is removed and oil is allowed to drain into a suitable collection container. The oil filter mounted on stem 164 (FIG. 10A) is removed and properly discarded. Oil filter adapter 160 (with proper bushing 161 selected) is attached to the engine as described above in connection with FIG. 10A. Hose 86, with connector 86B, is attached to connector 172. Hose 83, with connector 83C, is attached to connector 173. Drain plug adapter 190 (FIG. 11) is attached to oil drain plug opening 193 as mentioned above in connection with FIG. 11. Hose 80, with connector 80A, is attached to adapter 190.

To add cleaner, the vehicle is lowered to ground level, valve 46 is set to position A, regulator 41 is adjusted to set air pressure at gauge 38 to 80 psi, and switch 43 is thrown. Lid 48 is removed, one gallon of "Engine Process Cleaner" is poured into tank 47 and lid 48 is replaced. The cleaner circulates for one minute and switch 43 is turned off. The oil level of the engine crankcase is checked and oil is added until the crankcase is full. Switch 43 is activated, and the cleaner/oil mixture circulates throughout the engine; specifically, hose 80 vacuums the mixture from oil pan 192 into machine 20 where the mixture is filtered and fed back into the engine at adaptor 160. With valve 46 in its "process" position (position A), the mixture flows in two directions: First, into the main oil gallery feeding the main bearings and all other internal oil passages; and secondly, in reverse direction through the oil pump and out the oil pump pick-up screen. In the next step when the engine is started, the pressurized flow from the oil over-rides the flow created by machine 20 in hose 83 so that this mixture flows through hose 83 into machine 20 for filtering, and is re-introduced into the engine via adapter 160. Pump 55 then slows down, due to increased pressure from the oil pump encountered at filter block 50. Gauge 30 shows the pressure of the mixture coming from the oil pump. Gauge 32 shows the pressure of the mixture returning to the engine at adapter 160. The difference in these pressures shows the condition of filter 51, and when the difference is greater than 10 psi, the filter should be changed.

When the pressure indicated by gauge 32 is above twenty psi, the engine is started and allowed to idle until it reaches an operating temperature of 160 degrees on gauge 37; the engine is then shut down. Lid 48 is removed and one quart of "Engine Process Activator" is added and lid 48 is reinstalled. The mixture is allowed to circulate for one minute. Pressure gauge 32 should show a minimum of twenty psi; when it does, the engine is restarted and allowed to idle for ten minutes so that the initial cleaning is performed. The engine is then turned off and machine 20 is operated for one minute; switch 43 is then turned off.

To perform a post-cleaning check, screen 49 is removed from tank 47 to determine whether or not particles of hard carbon or sludge, wear metals, or any other foreign particles are present; the process has been successfully performed if no carbon or sludge contaminates are visible. If said contaminates are present, screeen 49 is cleaned and replaced, and the novel cleaning procedure is repeated for another 10 minutes. Such ten minute cycles and checks are continued until screen 49 no longer accumulates carbon or sludge. If there are signs of wear metals from within the engine, this indicates that the bearings are beginning to wear out and a mechanical analysis test (discussed below) should be performed. The mechanical analysis test also helps determine from where in the engine any other foreign particles are coming. To complete the process, the vehicle is lifted again, and purge hose 85 is attached to a waste oil receptacle. Valve 46 is switched to its purge position (position C). Switch 43 is activated and all fluid is pumped from oil pan 192 into the waste receptacle; all of the fluid has been evacuated when gauges 32 and 36 drop to zero. Valve 46 is briefly turned to "process" to purge fluid from hose 86. Gauge 32 will again show positive pressure; when it begins to drop, valve 46 is switched to its "backflush" position (position B). Gauge 30 will also again show positive pressure; when it begins to drop, valve 46 is switched to "purge" so that any remaining mixture is evacuated from oil pan 192. Switch 43 is then turned off, hoses 80, 83, and 86 are disconnected and reconnected to their respective positions on bracket 26, oil filter adapter 160 is removed, and a new oil filter is installed. Drain plug adapter 190 is removed and the original drain plug is returned to its original placement. The vehicle is lowered to ground level and the crankcase is filled in accordance with manufacturer's specifications. The engine is started and run at idle for 10–15 seconds, and the vehicle is checked for leaks. The engine is then turned off, the oil level is re-checked and oil is added if necessary.

Mechanical Analysis Test (FIGS. 13 and 14)

Machine 20 is connected to the vehicle as described in connection with the oil cleaning procedure, but drained oil is used instead of cleaner. Additional oil is added as needed to completely fill the crankcase. If the viscosity of the drained oil is not normal, fresh oil is used in its place. The vehicle is started and brought to operating temperature in the same manner as described in connection with the cleaning procedure.

To check the condition of the oil pump, the engine is turned off, valve 46 is set to "backflush," regulator 41 is set to 80 psi, switch 43 is turned on, and machine 20 is operated for two minutes. The pressure indication on gauge 30 represents the achievable back pressure that can be obtained under these circumstances. A bounce of the needle on pressure gauge 30, which corresponds to the pumping action of pump 55, is observed. The high reading should be about the same as the oil pressure at high rpms; this varies among engines, but is usually around 60 psi. The low reading should indicate no less than eighty-five percent of the high reading; a reading lower than that indicates wear occurring in the pump gears. If the low bounce of the needle indicates less than fifty percent of the high bounce, the oil pump is in poor shape and should be replaced. After a determination is made as to the oil pressures obtainable, switch 43 is turned off and screen 49 is checked for any solids. Solids, if found, are from the oil pump screen or from oil pan 192. A small amount of particles usually indicates that they came from the bottom of oil pan 192. This procedure may performed a second time to determine if more solids are present; if present, the oil pump screen is usually the source of said solids. Screen 49 is cleaned before returning it to tank 47. If additional solids are not found, and the back pressures have not changed, the oil pump screen is clear. If, during the pressure test, a high reading, greater than that of normal engine operation at high rpms, is observed and maintained after two minutes of pumping and no solids are present in screen 49, the check valve within the oil pump is malfunctioning and should be repaired. This could lead to higher than normal pressure entering the oil filter and cause the filter to blow out, either at the gasket or the seam.

Most General Motors vehicles and some foreign vehicles have a filter bypass valve installed in the oil filter mounting area. If the oil filter has a bypass valve installed, there is no bypass valve in the engine. If the filter has no bypass valve, there will be one on the mounting area. This valve must be plugged prior to the oil pump test to prevent flow from entering the main oil passageways.

To check the condition of the main and rod bearings (see FIG. 14), the FIG. 12 hook-up is modified by removing hose 83 therefrom, i.e., hose 83 is disconnected from adapter 160 and connected to bracket 26. Process valve 46 is turned to its "process" position. Switch 43 is activated, machine 20 is operated for two minutes, and gauge 32 is observed during that time. The analysis procedure for determining pressures is the same as that described above in connection with the oil pump, with the exception that the normal, or high bounce, of the needle does not always correspond with the rated pressure of the oil pump. The key is to determine the difference between the high bounce and the low bounce of the needle on gauge 32. The same percentages apply to determining the wear on the internal components. Moreover, any solid particles observed in screen 49 will be from the top of the engine, namely, the heads, the lifter valley and the crankcase walls.

Transmission Cleaning Process (FIGS. 15–17)

The engine is brought to normal operating temperature, and one quart of "Transmission Process Cleaner" is added to the transmission. The cleaner is a liquefying agent that breaks up the metal cross-linked polymers and the polypeptide bonds which hold the varnish contamination in place. The vehicle is driven for 1–2 miles (or the equivalent is accomplished by employing rollers or a dynometer), and all gear selections are operated evenly to properly circulate the cleaner throughout the transmission. With the engine off, hose 156 is attached to hose 80 (see FIG. 15). Hose 156 is inserted down the entire length of dipstick opening 159, so that the end of hose 156 is at the bottom of the transmission oil pan. Hose 85 is connected to a suitable waste oil receiver, and regulator 41 is set to 80 psi. Valve 46 is set to its "purge" position. Switch 43 is activated and machine 20 runs until the respective pressure readings on gauges 36 and 32 have returned to zero and liquid flow in sight glass 48A is complete. This step vacuums out the contents of the transmission oil pan for easier removal of the pan.

As depicted in FIG. 16, one of the transmission cooling lines is then removed from port 158 and transmission line fitting 151 is substituted therefor. Hose 152 is attached to fitting 151 with clamp 157B. Coupler 150 is inserted into the second end of hose 152 and secured into place with clamp 157A. Hose 80 is disconnected from hose 156 and attached to the second end of coupler 150. Switch 43 is turned on and the vacuuming step is repeated. During this step, gauges 36 and 32 may fall to zero before all of the fluid has been removed. Observation is made through glass 48A to determine if hose 80 is still vacuuming fluid from the transmission. Machine 20 is run until it appears that all of the fluid has been removed. Clamp 157B is then loosened, hose 152 is removed from fitting 151, and replaced onto the line that was previously removed from port 158. Clamp 157B is then tightened and the vacuuming step as just described is repeated. This procedure removes all of the fluid from the transmission cooler, the cooling lines, and most of the fluid from the torque converter. Transmission cooling line is then reattached to port 158.

In a variation of this method, a transmission cooling line is disconnected at a preselected location along its length, either at a point where the steel line connects to a rubber line, or by cutting the steel line if absolutely necessary (and resealing it with an appropriate compression fitting when the process is over), to gain access into the cooling lines. See FIG. 22 at numerals 158A and 158B.

Cooling system cleaning process (FIGS. 18, 18A, 18B)

This process is accomplished with anti-freeze or water. The process is performed with anti-freeze in the cooling system if the anti-freeze is in good condition. If the coolant is in poor condition, it is replaced with water.

To hook-up the novel cooling process, the cooling system is first depressurized for safety purposes.

The radiator fill opening cap is then removed. The free end of hose 133 (FIG. 18A) is inserted into the opening and fully inserted into the radiator. The second end of hose 133 is connected to fitting 57C, and coupler 90H is connected to coupler 91J. Regulator 40 is set to 40 psi, switch 45 is turned on and the contents of the radiator are vacuumed and cycled to tank 57 until the level of coolant within the radiator is below the position of radiator neck 145. Hose 133 is removed from the radiator and placed into coolant reservoir 146 (FIG. 18B) to vacuum the contents of the latter. Switch 45 is thrown to its "off" position and hose 133 is removed from the coolant reservoir and disconnected from port 57C of tank 57. The radiator cap is returned to its operable position and hose 94 is reconnected to fitting 57C.

The top radiator hose is then disconnected from radiator neck 145 (FIG. 18). Bushing 139 of proper size is screwed into place onto adapter 135. The top radiator hose is inserted into place on bushing 139 and secured with a hose clamp from the top radiator hose. A hose 125 of the proper size is selected, placed onto radiator neck 145 and secured into place with clamp 126A. Bushing 123 of proper size is screwed onto adapter 120, inserted into hose 125, and secured with clamp 126B. Coupler 90H is connected to connection 128, coupler 92K is connected to connection 127, and coupler 91J is connected to connection 136. Switch 45 is turned on so that the coolant is circulated.

Coolant from tank 57 is vacuumed through pump 56 and expelled into adapter 120. When the engine coolant system is full, excess coolant travels back to tank 57 via overflow hose 92, thereby preventing excessive pressure build-up within the engine cooling system. Gauge 35 is monitored; if the temperature is below the thermostat opening point, as should be the case, there should be little or no flow from fitting 57B into tank 57. All flow should be through fitting 57A. If the thermostat is stuck open, there will be substantial flow through fitting 57B as well. During engine operation, when the coolant reaches operating temperature, and the thermostat opens properly, flow into tank 57 switches from fitting 57A to 57B. If this flow does not switch between fittings 57A and 57B, the thermostat is not opening as it should and replacement is necessary. Gauge 34 shows the back pressure of the coolant flow between pump 56 and the radiator. Regulator 40 is adjusted accordingly to maintain a pressure reading on gauge 34 that is within the coolant system operating pressure. During engine off periods, regulator 40 may need to be lowered, and during engine on periods, regulator 40 may need to be increased to ensure adequate flow into the radiator.

The engine is started and idled until an operating temperature of at least 180 degrees F is reached as indicated by gauge 35 and coolant is flowing from fitting 57B. A pH check of the coolant from port 57B is made and recorded; if the antifreeze is good, the pH should be about 8–10. One bottle of "Cooling system cleaner, Part A" is added to tank 57 and allowed to circulate; when the pH of the coolant at port 57B is 4 or less, the circulation is continued for five minutes, i.e., the five minute time period starts when the pH of the coolant at port 57B is 4 or less. One bottle of "Cooling system cleaner, Part B" is then added to tank 57 and circulated for five minutes, or until the pH reading from port 57B stabilizes at the beginning pH. The engine is shut down and the specific gravity and Ph of the anti-freeze is checked. If said parameters are within specifications, the anti-freeze is not changed. If the process removed large amounts of rust and the anti-freeze is badly degraded, it should be changed.

With machine 20 still operating, hose 94 is disconnected from fitting 57C and switch 45 is turned off when tank 57 is nearly full; this allows air to be pumped into the cooling system to force out coolant, so that the hoses can be disconnected without spillage. Hoses 90, 91, and 92 are disconnected from adapters 120 and 135, the adapters are removed from the engine, and the top radiator hose is reconnected. Coupler 90H is placed into a receiver having sufficient capacity to hold the contents of tank 57, and hose 94 is reconnected to fitting 57C. Regulator 40 is set to 25 psi and switch 45 is turned on. The entire contents of tank 57 are pumped into the receiver, and switch 45 is turned off. The contents of the receiver are poured back into the radiator and coolant reservoir, in accordance with the normal filling procedure. The engine is started and checked for leaks.

Two further adapters are used in certain conditions, i.e., adapter 130 connects to connection 128 and adapter 134 connects to connection 136. This reverses the hook-up of hoses 90 and 91 to reverse the flow of fluid within the cooling system, thereby offering an alternative system flushing procedure.

Removing the polymerized film of glycol from within a cooling system with a two part cleaner restores the heat transfer properties of the metal surfaces, allowing the engine block to dissipate its heat normally. A further advantage is that the byproduct of the two part cleaner becomes a water softening agent and corrosion inhibitor; advantageously, the byproduct is left in the anti-freeze. This saves time by not requiring flushing of the system, and saves expense by not having to replace anti-freeze that has only lost its additives.

Gasoline Fuel Injection Cleaning (FIGS. 19 and 20)

Output hose 89 having connector 89G is the only hose needed for the gasoline fuel process hook-ups for multi-port fuel injection engines. Fuel flow control valve 100 is attached to connector 89G. Injector needle assembly 105 (see also FIG. 20) is attached to valve 100 and is inserted into air flow tunnel 116, upstream of throttle plate 117. When machine 20 is activated, fuel cleaner flow is injected directly at throttle plate 117, and vacuum created by the engine draws fuel cleaner into the intake manifold, around the 360 degree edge of throttle plate 117, providing cleaner flow to all internal areas of the intake manifold. To be entirely effective, the cleaning solution must enter the intake manifold at the throttle plate, be in a mist form which allows it to contact the interior surfaces and provide a washing effect, and must travel through the intake manifold and reach the combustion chamber while still in a mostly liquid form. More particularly, contamination removal requires the heavy misting effect of a slowly evaporating cleaner, which harnesses chemical cleaning along with the kinetic energy of droplets boiling off contamination, and must begin at the throttle plate, where contamination starts.

Fuel injection cleaning is performed with the engine operating at high idle. Two adapters may be employed, depending upon the specific engine being cleaned: fuel injection needle 105 (FIG. 19) and mister nozzle 110 (FIG. 20). If air induction tube 116 can be removed with the engine operating, mister 110 is usually more desirable. The cleaner spray is directed at throttle plate 117. Mister 110 is also used for cleaning throttle body injection systems and normal carburetors. The cleaner spray is directed around the outside edge and into the barrels of the carburetor or throttle body injector. In cases where tube 116 cannot be removed while the engine is operating, needle 105 is used. Needle 105 is inserted through rubber tube 116 just upstream of throttle plate 117, and at an angle preselected so that the cleaner spray hits the center of throttle plate 117. The flow of cleaner through the needle is viewed through sight glass 108.

Lid 54 is removed from tank 53 and one pint of "Gasoline fuel system cleaner" is added. Lid 54 is then securely replaced onto tank 53, and fuel flow control valve 100 is attached to coupler 89G. The other end of hose 89 is in fluid communication with tank 53. Mister 110 (FIG. 20) or needle 105 (FIG. 19) is attached to control valve 100, and knob 103A of valve 100 is turned to ensure the valve is closed. Regulator 42 is set to 40 psi, and switch 44 is turned to the "On" position. The engine is started and the idle is adjusted to 1200 to 1500 rpms with a suitable idle adjustment tool. Knob 103A is opened to begin cleaner flow; the flow is increased until the engine idle drops to about 800 rpms. Engine idle is readjusted to 1,200–1,500 rpms; the cleaner flows until the pint is completely consumed, i.e., when air only is being injected into the engine and the idle begins to increase. The idle adjustment tool is removed and the engine idles for a few minutes so that it re-adjusts to the proper gasoline flow, it being understood that the vehicle's computer will have reduced the flow of gasoline through the injectors in response to the rich mixture created by the introduction of the cleaner into the engine. The gasoline supply is not disconnected from the vehicle during this procedure.

Diesel Fuel System Cleaning (FIG. 21)

To hook up machine 20 for the novel diesel fuel process, the fuel line leading from the fuel tank to low pressure fuel pump 118 is removed at the fuel pump. Hose 114 is attached in its place and secured with clamp 115B. Adapter 111 is inserted into hose 114 and secured into place with clamp 115A. Adapter 111 is connected to coupler 89G. The fuel return line from the high pressure fuel pump is removed at fuel pressure regulator 119 and a second hose 114 is substituted therefor at fitting 119A, secured with a second clamp 115B. A second adapter 111 is connected to hose 114 and secured with a second clamp 115A. Second adapter 111 is connected to coupling 88F. Lid 54 is removed from tank 53 and one quart of "Diesel fuel system cleaner" is added. Lid 48, having sight glass 48A, is then placed onto tank 53. There is no pressure build up within tank 53 during this process.

Fuel cleaner is vacuumed into fuel pressure line 118A, which supplies fuel to fuel injectors 118B. Excess fuel, controlled by regulator 119, is returned to remote charging tank 53. Said tank 53 will now function as an auxiliary fuel tank until cleaning is complete.

The engine is started and the idle raised to 1000 rpms during the cleaning. The engine is run until ninety percent of the cleaner is used in tank 53; the engine is then turned off, the fuel filter is replaced, and all adapters are removed and the fuel lines are re-connected to their original positions. Any remaining cleaner within tank 53 is expelled into the fuel tank of the vehicle by attaching adapter 111 to coupling 89G, replacing lid 54 onto tank 53, setting tank 53 pressure to 10 psi, and turning on switch 44.

FIG. 22 is a schematic view of a typical fuel injected engine and automatic transmission; in effect, it is a summary of the hook-ups depicted in FIGS. 12–21. Arrows represent hoses that are attached to novel machine 20. FIG. 22 includes all of the hook-ups described in connection with FIGS. 12–21.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method for cleaning a transmission of a vehicle having a radiator, said transmission including a transmission fluid pan, transmission cooling lines, and a torque converter, said method comprising the steps of:

starting an engine of said vehicle and bringing it to normal operating temperature;

charging a predetermined amount of a preselected transmission cleaner into said transmission;

driving the vehicle for a predetermined distance and changing gears at preselected times while driving so that all gears of said transmission are used equally during said driving;

shutting down the engine;

purging transmission fluid from said transmission fluid pan by submerging a trailing end of a first hose in said transmission fluid, connecting a leading end of said first hose into fluid communication with an inlet of a remote charging tank, connecting an outlet of said remote charging tank through a switch means to a source of negative pressure, setting said switch means to cause said transmission fluid to flow into a transmission fluid waste tank disposed between said outlet and said source of negative pressure;

removing said trailing end of said first hose from said transmission fluid pan;

disconnecting a transmission cooling line from a preselected port of said radiator;

placing said trailing end of said first hose into fluid communication with said transmission cooling line at said preselected port while maintaining said leading end of said first hose in fluid communication with said inlet of said remote charging tank;

vacuuming transmission fluid from said transmission cooling line; and reattaching said transmission cooling line;

whereby all transmission fluid is removed from said transmission cooling lines; and whereby most of said transmission fluid is removed from said torque converter.

2. The method of claim 1, wherein the step of placing said trailing end of said first hose into fluid communication with said transmission cooling line includes the step of separating from a metallic section of said transmission cooling line a rubber hose portion thereof and placing a free end of said rubber hose into fluid communication with said trailing end of said first hose.

3. The method of claim 1, wherein the step of placing said trailing end of said first hose into fluid communication with said transmission cooling line includes the step of separating from a metallic section of said transmission cooling line a rubber hose portion thereof and placing a free end of said metallic section into fluid communication with said trailing end of said first hose.

* * * * *